US011622088B2

(12) United States Patent
Kitazato et al.

(10) Patent No.: US 11,622,088 B2
(45) Date of Patent: Apr. 4, 2023

(54) RECEPTION APPARATUS, TRANSMISSION APPARATUS, AND DATA PROCESSING METHOD

(71) Applicant: SONY CORPORATION, Tokyo (JP)

(72) Inventors: Naohisa Kitazato, Tokyo (JP); Yasuaki Yamagishi, Kanagawa (JP); Taketoshi Yamane, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 88 days.

(21) Appl. No.: 15/564,056

(22) PCT Filed: Jun. 2, 2016

(86) PCT No.: PCT/JP2016/002684
§ 371 (c)(1),
(2) Date: Oct. 3, 2017

(87) PCT Pub. No.: WO2016/203726
PCT Pub. Date: Dec. 22, 2016

(65) Prior Publication Data

US 2018/0091769 A1 Mar. 29, 2018

(30) Foreign Application Priority Data

Jun. 16, 2015 (JP) ............................ JP2015-121335

(51) Int. Cl.
*H04N 7/025* (2006.01)
*H04N 7/088* (2006.01)
(Continued)

(52) U.S. Cl.
CPC ..... *H04N 7/0885* (2013.01); *H04N 21/23611* (2013.01); *H04N 21/435* (2013.01);
(Continued)

(58) Field of Classification Search
CPC ........... H04N 7/0885; H04N 21/23611; H04N 21/435; H04N 21/4884; H04N 21/85406;
(Continued)

(56) References Cited

U.S. PATENT DOCUMENTS 8,695,048 B1 * 4/2014 Kellicker ......... H04N 21/47202 348/468
8,782,721 B1 * 7/2014 Kellicker ....... H04N 21/234336 348/468
(Continued)

FOREIGN PATENT DOCUMENTS

JP 2012-169885 A 9/2012
JP 5713141 B1 5/2015
(Continued)

OTHER PUBLICATIONS

International Search Report dated Aug. 19, 2016 in PCT/JP2016/002684.
(Continued)

*Primary Examiner* — Annan Q Shang
(74) *Attorney, Agent, or Firm* — Oblon, McClelland, Maier & Neustadt, L.L.P.

(57) ABSTRACT

A reception apparatus is provided that includes circuitry configured to receive a digital data stream. The circuitry is configured to acquire closed caption information included in the digital data stream. The circuitry is configured to acquire control information including selection information indicating a selection of a specific mode from a plurality of modes for specifying when closed caption text is to be displayed. The circuitry is further configured to output the closed caption text included in the closed caption information for display to a user, at a display time according to the specific mode, based on the selection information included in the control information.

20 Claims, 26 Drawing Sheets

(51) Int. Cl.

| | |
|---|---|
| ***H04N 21/435*** | (2011.01) |
| ***H04N 21/488*** | (2011.01) |
| ***H04N 21/854*** | (2011.01) |
| ***H04N 21/236*** | (2011.01) |
| *H04N 13/178* | (2018.01) |
| *H04N 13/183* | (2018.01) |

(52) U.S. Cl.
CPC ... *H04N 21/4884* (2013.01); *H04N 21/85406* (2013.01); *H04N 13/178* (2018.05); *H04N 13/183* (2018.05); *H04N 21/23614* (2013.01)

(58) Field of Classification Search
CPC ............... H04N 13/178; H04N 13/183; H04N 21/23614
See application file for complete search history.

(56) References Cited

U.S. PATENT DOCUMENTS

| | | | | |
|---|---|---|---|---|
| 9,748,504 | B2 * | 8/2017 | Xia | H01L 51/0088 |
| 2013/0185760 | A1 * | 7/2013 | Yamagishi | H04N 21/235 725/137 |
| 2013/0188922 | A1 * | 7/2013 | Furbeck | H04N 5/772 386/239 |
| 2013/0291001 | A1 * | 10/2013 | Besehanic | H04N 21/8358 725/20 |
| 2014/0229970 | A1 * | 8/2014 | Besehanic | H04N 21/6175 725/20 |
| 2014/0280874 | A1 * | 9/2014 | Bosworth | G06F 11/34 709/224 |
| 2014/0280888 | A1 * | 9/2014 | McMillan | H04L 43/04 709/224 |
| 2015/0128162 | A1 * | 5/2015 | Ionescu | H04N 21/44209 725/14 |
| 2015/0208102 | A1 * | 7/2015 | Takahashi | H04N 21/4854 348/441 |
| 2016/0227263 | A1 | 8/2016 | Lee et al. | |
| 2016/0300596 | A1 * | 10/2016 | Ransdell | G11B 27/34 |
| 2016/0345078 | A1 * | 11/2016 | Landow | H04N 21/8133 |
| 2017/0048485 | A1 * | 2/2017 | Dewa | H04N 21/431 |
| 2017/0223432 | A1 * | 8/2017 | Lee | H04N 7/015 |
| 2018/0035153 | A1 * | 2/2018 | Yang | G11C 29/50012 |
| 2018/0054660 | A1 * | 2/2018 | Hwang | H04N 21/235 |
| 2018/0077456 | A1 * | 3/2018 | Kitahara | H04N 21/845 |
| 2018/0205975 | A1 * | 7/2018 | Oh | H04N 21/854 |
| 2018/0249167 | A1 * | 8/2018 | Deshpande | H04N 21/435 |

FOREIGN PATENT DOCUMENTS

| | | | |
|---|---|---|---|
| WO | WO 2013/088986 | A1 | 6/2013 |
| WO | WO 2014/109321 | A1 | 7/2014 |
| WO | WO 2015/064383 | A1 | 5/2015 |
| WO | WO 2015/065104 | A1 | 5/2015 |

OTHER PUBLICATIONS

David Singer, "Editor's study of 14496-30 and 14496-12 DAM (Timed Text in MP4)", 105. MPEG Meeting; Jul. 29, 2013-Feb. 8, 2013; Vienna; (Motion Picture Expert Group or ISO/IEC JTC1/SC29/WG11), No. m30103, XP030058631, sections 1, 4.1,4.2, 5.1; p. vii; Jul. 19, 2013, 23 pages.

Notification of Reasons(s) for Refusal dated Feb. 5, 2019 in corresponding to Japanese Patent Application No. 2015-121335 (with English translation) (8 pages).

Office Action dated Jun. 11, 2019 in corresponding Japanese Patent Application No. 2015-121335 (with English Translation), 12 pages.

* cited by examiner

FIG. 4

```
<MPD>
 <Period>
  <AdaptationSet>
   <Representation>
    <SubRepresentation>
     ...
    </SubRepresentation>
    <SubRepresentation>
     ...
    </SubRepresentation>
   </Representation>
   <Representation>
    ...
   </Representation>
  </AdaptationSet>
  <AdaptationSet>
   ...
  </AdaptationSet>
 </Period>
 <Period>
  ...
 </Period>
</MPD>
```

FIG. 10

| | Mode | | schemeIdUri | Explanation |
|---|---|---|---|---|
| 1 | MODE 1 | | ttmlTimeOnly | COMPLY WITH TIME INFORMATION SPECIFIED IN TTML FILE |
| 2 | MODE 2 | MODE 2-1 | sampleTimeOnly | IGNORE TIME INFORMATION SPECIFIED IN TTML FILE AND COMPLY WITH TIME INFORMATION IN mp4 FILE FORMAT START AT TIME ACCORDING TO BMDT OF moof BOX AND CONTINUE ONLY DURING TIME PERIOD ACCORDING TO SampleDuration |
| | | MODE 2-2 | sampleTimeButTillNext | IGNORE TIME INFORMATION SPECIFIED IN TTML FILE AND COMPLY WITH TIME INFORMATION OF mp4 FILE FORMAT START AT TIME ACCORDING TO BMDT OF moof BOX OF TARGET TTML SAMPLE AND CONTINUE UNTIL TIME ACCORDING TO BMDT OF moof BOX OF TARGET TTML SAMPLE |
| 3 | MODE 3 | | asap | IGNORE TIME INFORMATION SPECIFIED IN TTML FILE AND TIME INFORMATION OF mp4 FILE FORMAT AND IMMEDIATELY PROCESS TTML FILE ACQUIRED |

```
Model:TTML Time Only

<MPD>
 <Period>
  <AdaptationSet>
   <Role schemeIdUri="" urn:mpeg:dash:role:2011" value=" caption" />
   <EssentialProperty schemeIdUri= "atsc:ttmlMode:ttmlTimeOnly" />
   <SegmentTemplate … media= "video/$Number$.mp4 " />
  </AdaptationSet>
 </Period>
</MPD>
```

FIG. 13

Mode2-1: Sample Time Only

```
<MPD>
 <Period>
  <AdaptationSet>
   <Role schemeIdUri=" urn:mpeg:dash:role:2011"  value=" caption" />
   <EssentialProperty schemeIdUri= "atsc:ttmlMode:sampleTimeOnly" />
    <SegmentTemplate … media= "video/$Number$.mp4 "/>
  </AdaptationSet>
 </Period>
</MPD>
```

FIG. 15

Mode2-2:Sample Time Only But Till Next

```
<MPD>
 <Period>
  <AdaptationSet>
   <Role schemeIdUri=" urn:mpeg:dash:role:2011"  value=" caption" />
   <EssentialProperty schemeIdUri= "atsc:ttmlMode:sampleTimeOnlyButTillNext" />
    <SegmentTemplate ··· media= "video/$Number$.mp4 "/>
  </AdaptationSet>
 </Period>
</MPD>
```

RECEPTION APPARATUS, TRANSMISSION APPARATUS, AND DATA PROCESSING METHOD

TECHNICAL FIELD

The present technology relates to a reception apparatus, a transmission apparatus, and a data processing method and, more particularly, to a reception apparatus, a transmission apparatus, and a data processing method which are configured to display a closed caption at desired time.

CROSS REFERENCE TO RELATED APPLICATIONS

This application claims the benefit of Japanese Priority Patent Application JP 2015-121335 filed on Jun. 16, 2015, the entire contents of which are incorporated herein by reference.

BACKGROUND ART

As a method of superimposing and displaying a closed caption on video, a timed text markup language (TTML) is known which is a markup language capable of specifying display timing, a display position, or the like (e.g., see PTL 1). The TTML is standardized by World Wide Web Consortium (W3C).

CITATION LIST

Patent Literature

PTL 1: JP 2012-169885 A

SUMMARY OF INVENTION

Technical Problem

Technologies for displaying a closed caption using the TTML or the like have not been established, and proposal for displaying a closed caption at desired time has been demanded.

The present technology has been made in view of such circumstances, and is configured to display a closed caption at desired time.

Solution to Problem

According to an embodiment of the present disclosure, there is provided a reception apparatus including circuitry configured to receive a digital data stream and acquire closed caption information included in the digital data stream. The circuitry is configured to acquire control information including selection information indicating a selection of a specific mode from a plurality of modes for specifying when closed caption text is to be displayed. The circuitry is further configured to output the closed caption text included in the closed caption information for display to a user, at a display time according to the specific mode, based on the selection information included in the control information.

According to an embodiment of the present disclosure, there is provided a data processing method including acquiring, by circuitry of a reception apparatus, closed caption information included in a digital data stream. The method includes acquiring, by the circuitry of the reception apparatus, control information including selection information indicating a selection of a specific mode from a plurality of modes for specifying when closed caption text is to be displayed. The method further includes controlling, by the circuitry of the reception apparatus, output of the closed caption text included in the closed caption information, at a display time according to the specific mode, based on the selection information included in the control information.

According to an embodiment of the present disclosure, there is provided a transmission apparatus including circuitry configured to generate control information including selection information indicating a selection of a specific mode from a plurality of modes for specifying when closed caption text is to be displayed. The circuitry is further configured to transmit a digital data stream including the control information and closed caption information including the closed caption text.

According to an embodiment of the present disclosure, there is provided a data processing method including generating, by circuitry of a transmission apparatus, control information including selection information indicating a selection of a specific mode from a plurality of modes for specifying when closed caption text is to be displayed. The method further includes transmitting, by the circuitry of the transmission apparatus, a digital data stream including the control information and closed caption information including the closed caption text.

Advantageous Effects of Invention

According to the first and second aspects of the present technology, the closed caption can be displayed at desired time.

The present technology is not necessarily limited to the effects described here, and may have any effect described in the present disclosure.

BRIEF DESCRIPTION OF DRAWINGS

FIG. 4 is a diagram illustrating a description example of the MPD file.

FIG. 10 is a table illustrating an exemplary TTML processing mode.

FIG. 13 is a diagram illustrating a description example of an MPD file operated in mode 2-1.

FIG. 15 is a diagram illustrating a description example of an MPD file operated in mode 2-2.

DESCRIPTION OF EMBODIMENTS

Figure 1:
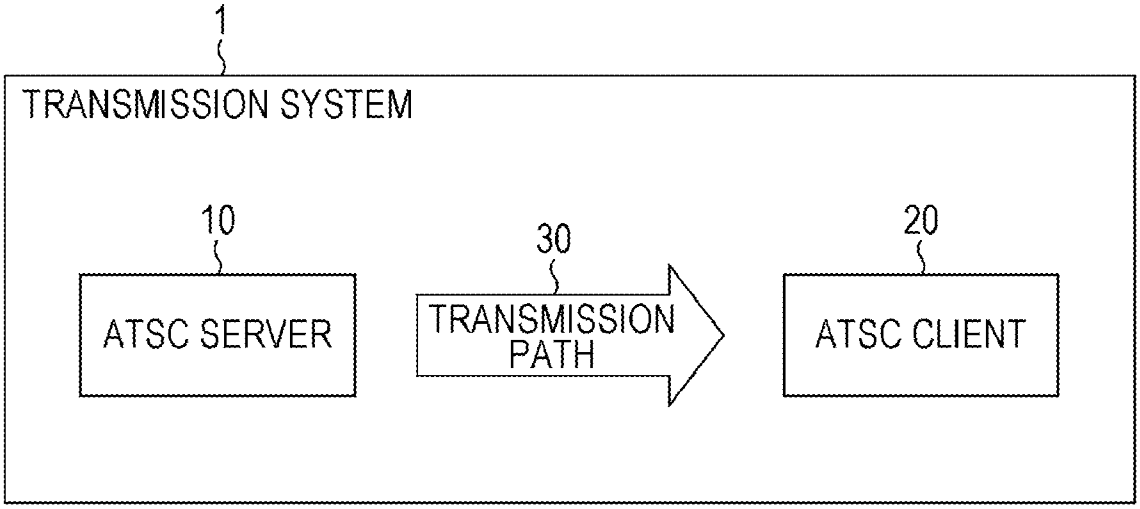
FIG. 1 is a diagram illustrating a configuration of an embodiment of a transmission system to which the present technology is applied.

An embodiment of the present technology will be described below with reference to the drawings. Description will be given in the following order.

1. Configuration of system
2. Summary of the present technology
3. Specific example of operation (1) Mode 1: TTML Time Only
(2) Mode 2: Sample Time Only
(2-1) Mode 2-1: Sample Time Only
(2-2) Mode 2-2: Sample Time Only But Till Next
(3) Mode 3: Asap 4. Configurations of apparatuses
5. Processing performed by apparatuses
6. Modifications
7. Configuration of computer <1. Configuration of System>

FIG. 1 is a diagram illustrating a configuration of an embodiment of a transmission system to which the present technology is applied. Note that a system represents a logical assembly of a plurality of apparatuses.

In FIG. 1, the transmission system 1 includes an ATSC server 10 and an ATSC client 20. In this transmission system 1, data is transmitted in accordance with a digital broadcasting standard such as ATSC 3.0. The ATSC 3.0 is a next generation of Advanced Television Systems Committee (ATSC) standard under development.

The ATSC server 10 is a transmitter in compliance with the digital broadcasting standard such as ATSC 3.0, and includes, for example, a plurality of servers. The ATSC server 10 transmits, as a digital broadcasting signal, a video, audio, or closed caption (component) stream or the like constituting content such as a TV program, through a transmission path 30.

The ATSC client 20 is a receiver in compliance with the digital broadcasting standard such as ATSC 3.0, and includes, for example, a fixed receiver such as a TV set or a set-top box, or a mobile receiver such as a smartphone, a mobile phone, or a tablet computer. Furthermore, the ATSC client 20 may be for example a device mounted to a motor vehicle, such as a vehicle TV.

The ATSC client 20 receives a digital broadcasting signal transmitted from the ATSC server 10 through the transmission path 30, acquires and processes the video, audio, or closed caption (component) stream or the like, and outputs video or sound of the content such as a TV program.

Note that, in FIG. 1, as the transmission path 30, for example a satellite circuit, a cable television network (wired circuit), or the like can be used, in addition to a ground wave.

<2. Summary of the Present Technology>

(Protocol Stack)

The ATSC 3.0 is determined not to use a transport stream (TS) packet but to use an IP/UDP packet, that is, an Internet protocol (IP) packet including a user datagram protocol (UDP) packet, for data transmission.

Furthermore, the ATSC 3.0 has parallel transport protocols, that is, Real-Time Object Delivery over Unidirectional Transport (ROUTE) and MPEG Media Transport (MMT), and any of the transport protocols is used to transmit the video, audio, or closed caption (component) stream or the like.

Herein, the ROUTE is an expanded protocol of a file delivery over unidirectional transport (FLUTE) which is a protocol suitable for unidirectional multicast transfer of a binary file. Furthermore, the MMT is a transport system used over an Internet Protocol (IP), and is configured to refer to data of video, audio, or the like by setting an IP address or a uniform resource locator (URL) based on control information.

Furthermore, the ATSC 3.0 is configured assuming provision of link layer signaling (LLS) information and service layer signaling (SLS) information, as signaling, and the SLS information is acquired for services, according to information described in the LLS information having been acquired.

Herein, the LLS information now includes, for example, metadata such as a service list table (SLT). The SLT metadata includes information representing a configuration of the stream or the service in a broadcast network, such as information (selection information) necessary for selection of service.

Furthermore, the SLS information includes metadata such as user service description (USD), LCT session instance description (LSID), or media presentation description (MPD). The USD metadata includes information such as an acquisition destination of other metadata. The LSID metadata is control information of a ROUTE protocol. The MPD metadata is control information for managing reproduction of a component stream. Note that the metadata such as USD, LSID, or MPD is described in a markup language such as an Extensible Markup Language (XML). Furthermore, the MPD metadata is compliant with MPEG-dynamic adaptive streaming over http (DASH) standard. The MPD metadata is provided in an XML format file, so that the MPD metadata will be described below as an MPD file.

Figure 2:
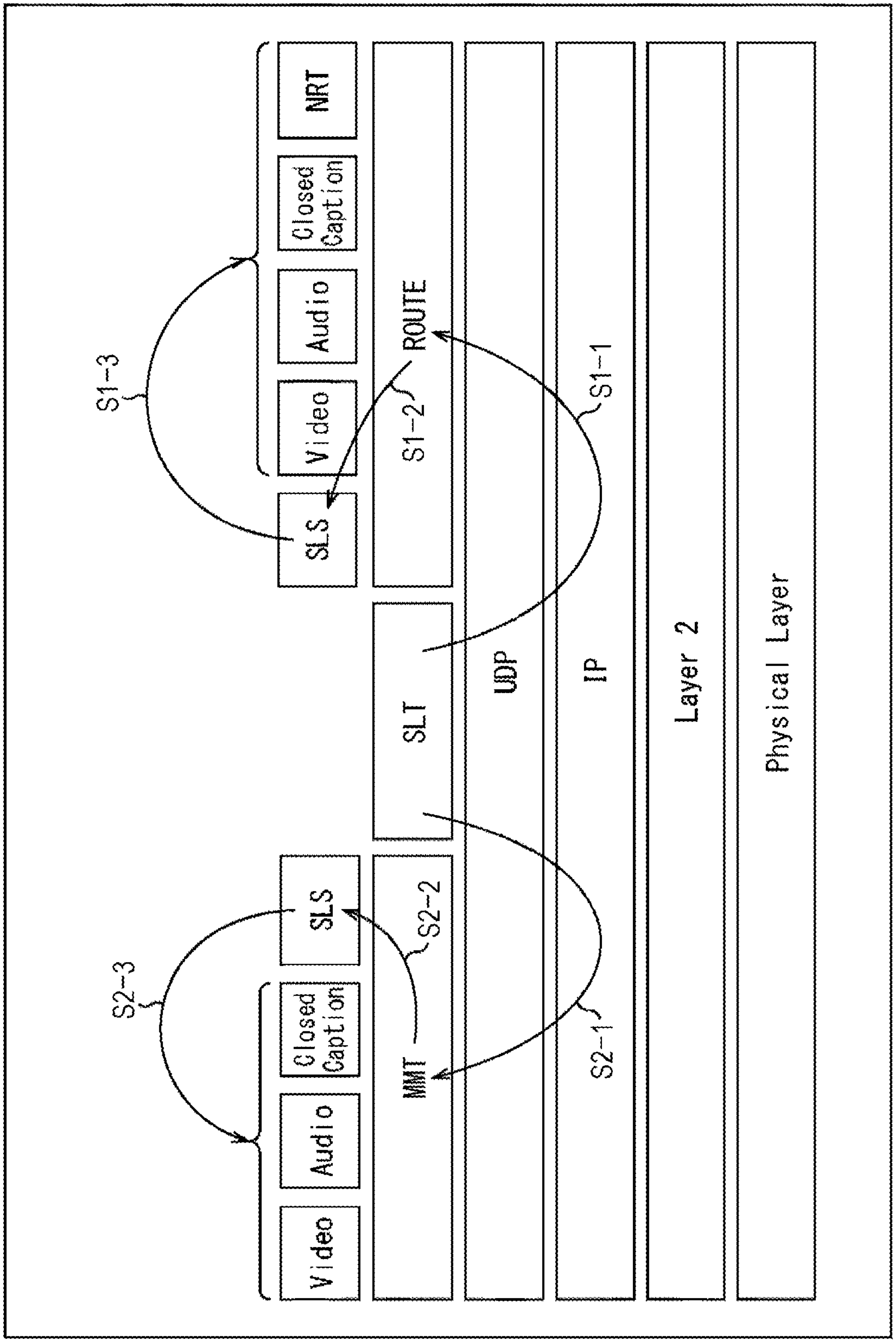
FIG. 2 is a diagram illustrating a protocol stack according to the present example.

FIG. 2 is a diagram illustrating a protocol stack according to the present example.

In FIG. 2, the lowest layer is defined as a physical layer (Physical Layer). An upper layer adjacent to the physical layer is defined as a layer 2 (Layer2). Furthermore, an upper layer adjacent to the layer 2 is defined as an IP layer. Furthermore, an upper layer adjacent to the IP layer is defined as a UDP layer. That is, an IP packet including a UDP packet (IP/UDP packet) is arranged and encapsulated in a payload of a generic packet in the layer 2. Furthermore, the physical layer has a frame (ATSC physical frame) including a preamble and a data section, and in the data section, data is mapped which is obtained by processing about the physical layer, such as interleave or mapping, after error correction parity is added to a BB frame obtained by encapsulating a plurality of generic packets.

An upper layer adjacent to the UDP layer includes the ROUTE, the MMT, and the SLT. That is, the video, audio, and closed caption streams, an SLS information stream, and an NRT content stream are stored in the IP/UDP packet, and transmitted in a ROUTE session. Note that the NRT content is content distributed by non real time (NRT) broadcast, and is reproduced after once stored in a storage of the ATSC client 20. Furthermore, a file other than the NRT content (e.g., application file) may be transmitted in the ROUTE session.

In contrast, the video, audio, and closed caption streams, and the SLS information stream are stored in the IP/UDP packet, and transmitted in an MMT session. Furthermore, the SLT metadata is transmitted by being stored in the IP/UDP packet.

Since the above-mentioned protocol stack is employed, when selecting a service (channel) provided by the component stream transmitted in the ROUTE session, the ATSC client 20 acquires the SLS information transmitted in the ROUTE session, according to the selection information included in the SLT metadata (S1-1, S1-2). Then, the ATSC client 20 is connected to the component stream providing the selected service, according to the metadata such as the USD, LSID, or MPD (S1-3). Thus, the ATSC client 20 outputs video or sound of content (e.g., TV program) according to the selected service.

Furthermore, when selecting a service provided by the component stream transmitted in the MMT session, the ATSC client 20 acquires the SLS information transmitted in the MMT session, according to the selection information included in the SLT metadata (S2-1, S2-2). Then, the ATSC client 20 is connected to the component stream providing the selected service, according to the metadata such as the USD, LSID, or MPD (S2-3). Thus, the ATSC client 20 outputs video or sound of content (e.g., TV program) according to the selected service.

(Structure of MPD File)

Figure 3:
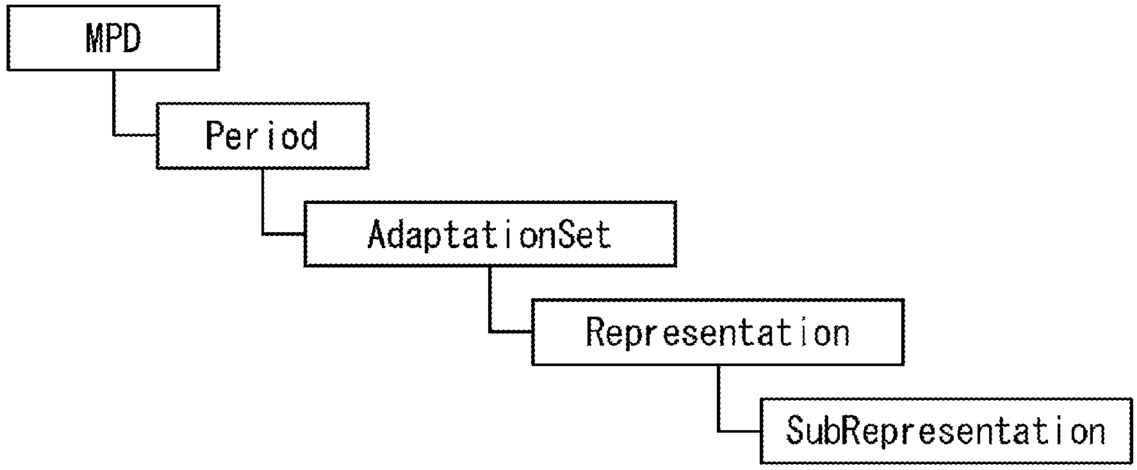
FIG. 3 is a diagram illustrating a structure of an MPD file.

Next, the MPD file transmitted as the SLS information will be described with reference to FIGS. 3 to 8. FIG. 3 is a diagram illustrating a structure of the MPD file. Furthermore, the MPD file is described in an XML hierarchical structure, as illustrated in a description example of FIG. 4.

Herein, as illustrated in FIG. 3, the MPD file includes a Period element, an AdaptationSet element, a Representation element, and a SubRepresentation element which are described in a hierarchical structure. The Period element is a unit for description of a configuration of content such as a TV program. Furthermore, the AdaptationSet element, the Representation element, or the SubRepresentation element is used for each of the video, audio, and closed caption (component) streams and the like to describe attributes of each stream.

Specifically, the AdaptationSet elements represent streams which are encoded from various sources. For selection of the stream by the ATSC client 20, for example, according to a parameter such as a bit rate, the Representation elements are arranged in the AdaptationSet element to have a list of, for example, a plurality of streams to be selected having different parameters such as bit rates. Normally, the AdaptationSet element or the Representation element corresponds to a single stream such as the video, audio, or closed caption stream.

Figure 5:
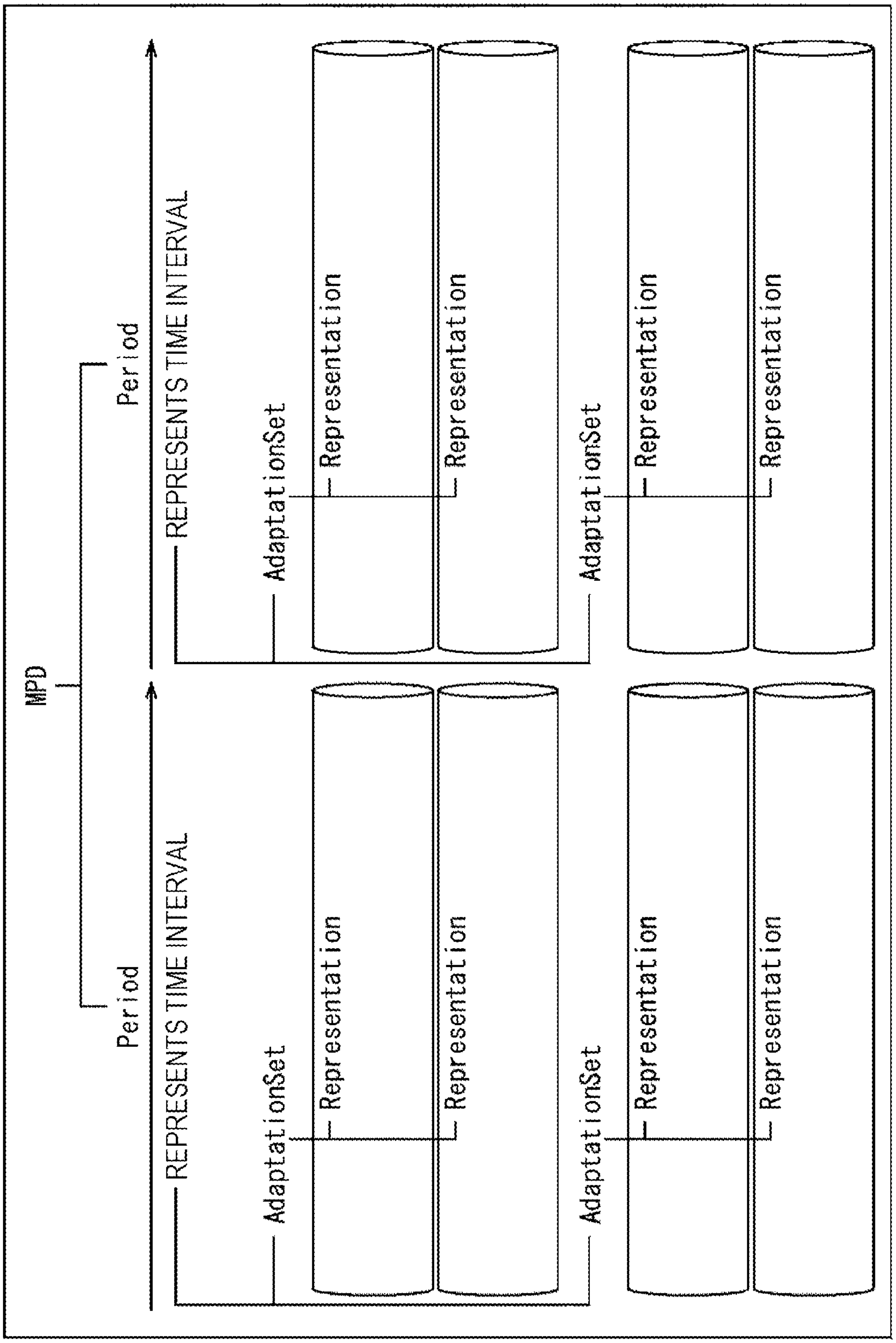
FIG. 5 is a diagram illustrating a relationship between AdaptationSet elements and Representation elements to represent a multiplexed stream.

Furthermore, when the AdaptationSet element represents a multiplexed stream having a plurality of streams of the video stream, audio stream, closed caption stream, or the like, the Representation elements are arranged in the AdaptationSet element to have a list of, for example, a plurality of multiplexed streams to be selected having different parameters such as bit rates. That is, as illustrated in FIG. 5, a plurality of AdaptationSet elements representing the multiplexed stream is arranged in each of the Period elements representing a time interval, and a plurality of Representation elements are arranged in each of the AdaptationSet elements to have a list of, for example, a plurality of multiplexed streams having different bit rates.

Figure 6:
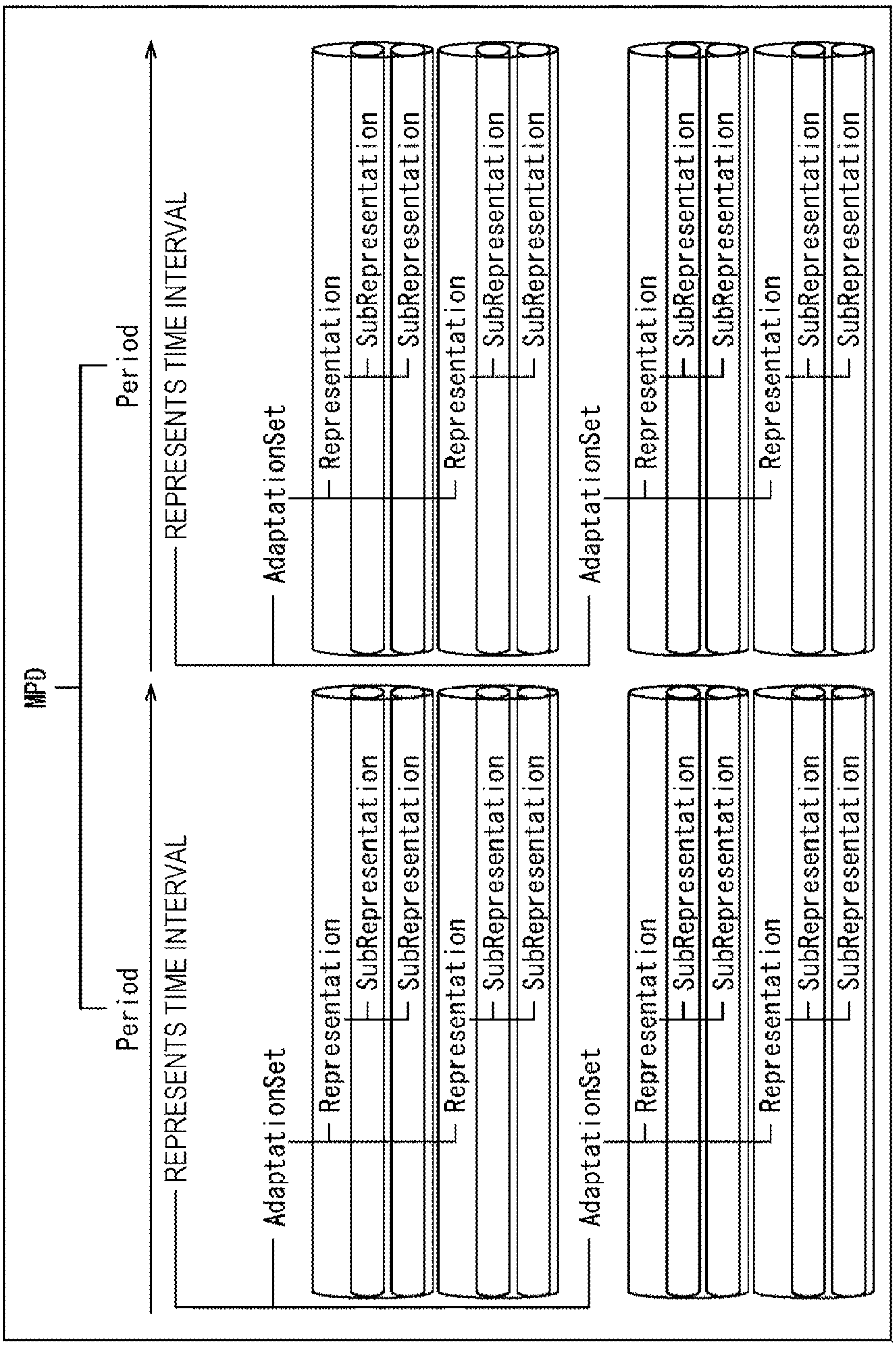
FIG. 6 is a diagram illustrating a relationship between AdaptationSet elements, Representation elements, and SubRepresentation elements to represent a multiplexed stream.

Furthermore, in this configuration, SubRepresentation elements can be arranged in subordination to the Representation elements to describe the attributes of the component streams constituting the multiplexed stream. That is, as illustrated in FIG. 6, a plurality of AdaptationSet elements representing the multiplexed stream is arranged in each Period element representing a time interval, for example, a plurality of Representation elements representing the multiplexed stream having different bit rates are arranged in each AdaptationSet element, and furthermore, the SubRepresentation elements are arranged in each Representation element, and for example, an attribute of the video stream, audio stream, or closed caption stream can be described therein.

Figure 7:
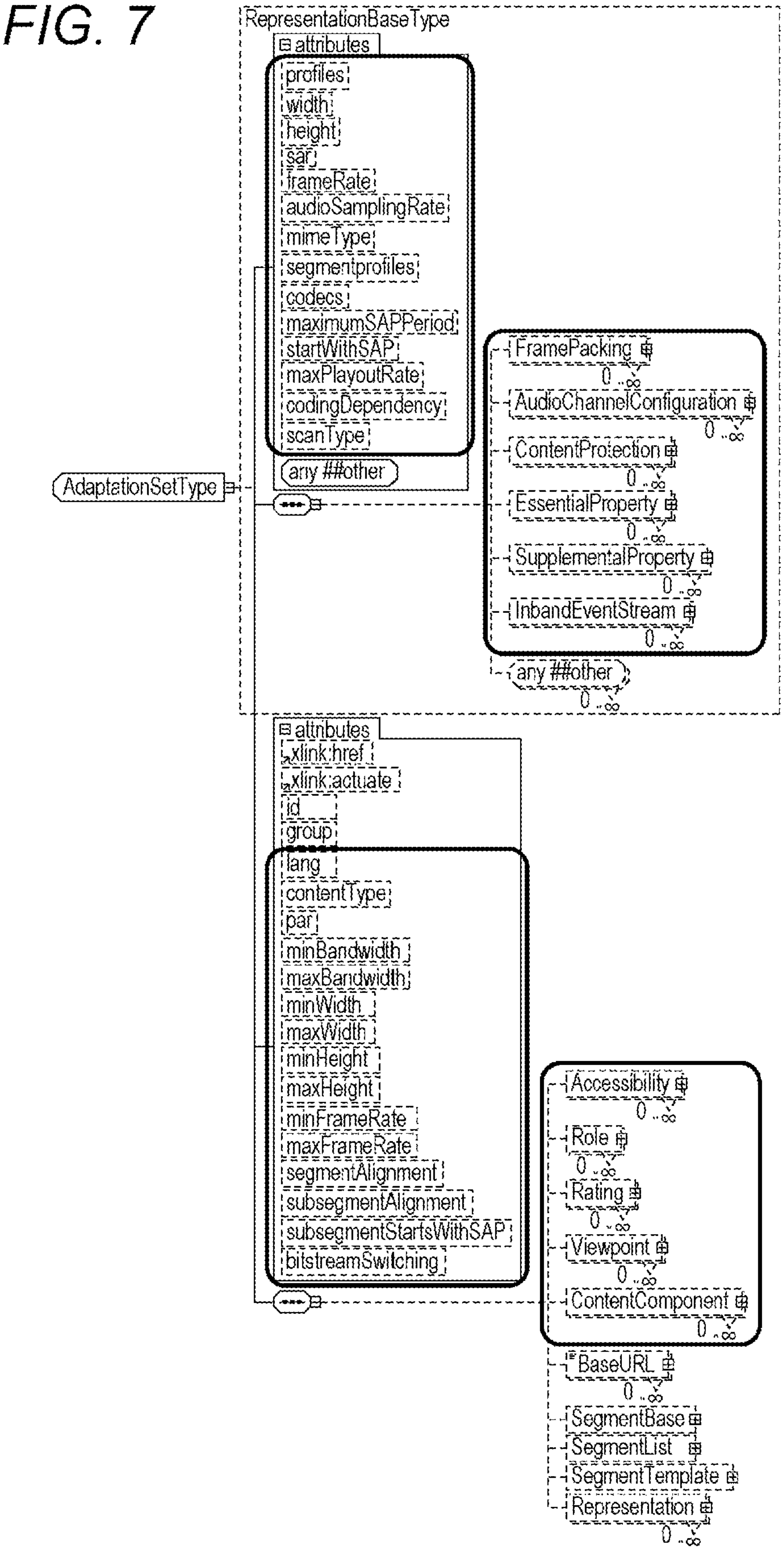
FIG. 7 is a diagram illustrating exemplary attributes and elements which can be included in an AdaptationSet element.
Figure 8:
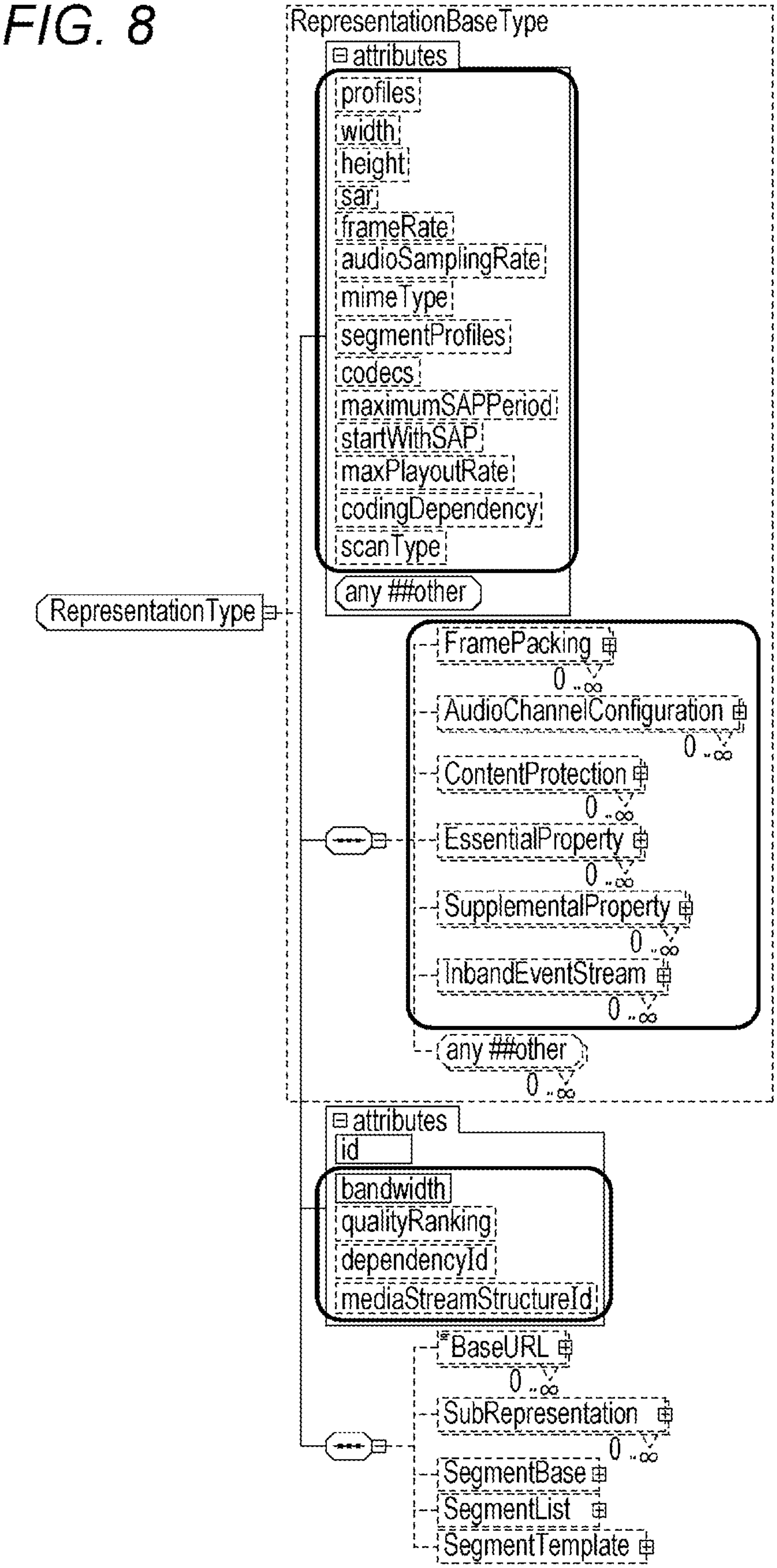
FIG. 8 is a diagram illustrating exemplary attributes and elements which can be included in a Representation element.

Note that the AdaptationSet element corresponds to a multiplexed stream of a plurality of streams, in addition to a single stream such as the video stream or the audio stream. In the MPEG-DASH standard, the attributes and elements of such an AdaptationSet element are defined as illustrated in FIG. 7. Furthermore, the Representation element includes, for example, a plurality of streams to be selected having different parameters such as bit rates within the range of the AdaptationSet element being a higher element (parent element). In the MPEG-DASH standard, the attributes and elements of such a Representation element are defined as illustrated in FIG. 8. Note that the attributes and elements of FIG. 8 can be included in the SubRepresentation element.

(MP4 File Format)

When the ROUTE is used as the transport protocol, an MP4 file format may be employed for a streaming file format. The MP4 file format is derived from an ISO base media file format defined in an ISO/IEC 14496-12. The ISO base media file format includes a tree structure referred to as a box (Box).

Herein, a segment transmitted in the ROUTE session includes an initialization segment and a media segment. The initialization segment includes initialization information such as a data compression method. Furthermore, the media segment stores data of the video, audio, or closed caption (component) stream or the like.

Figure 9:
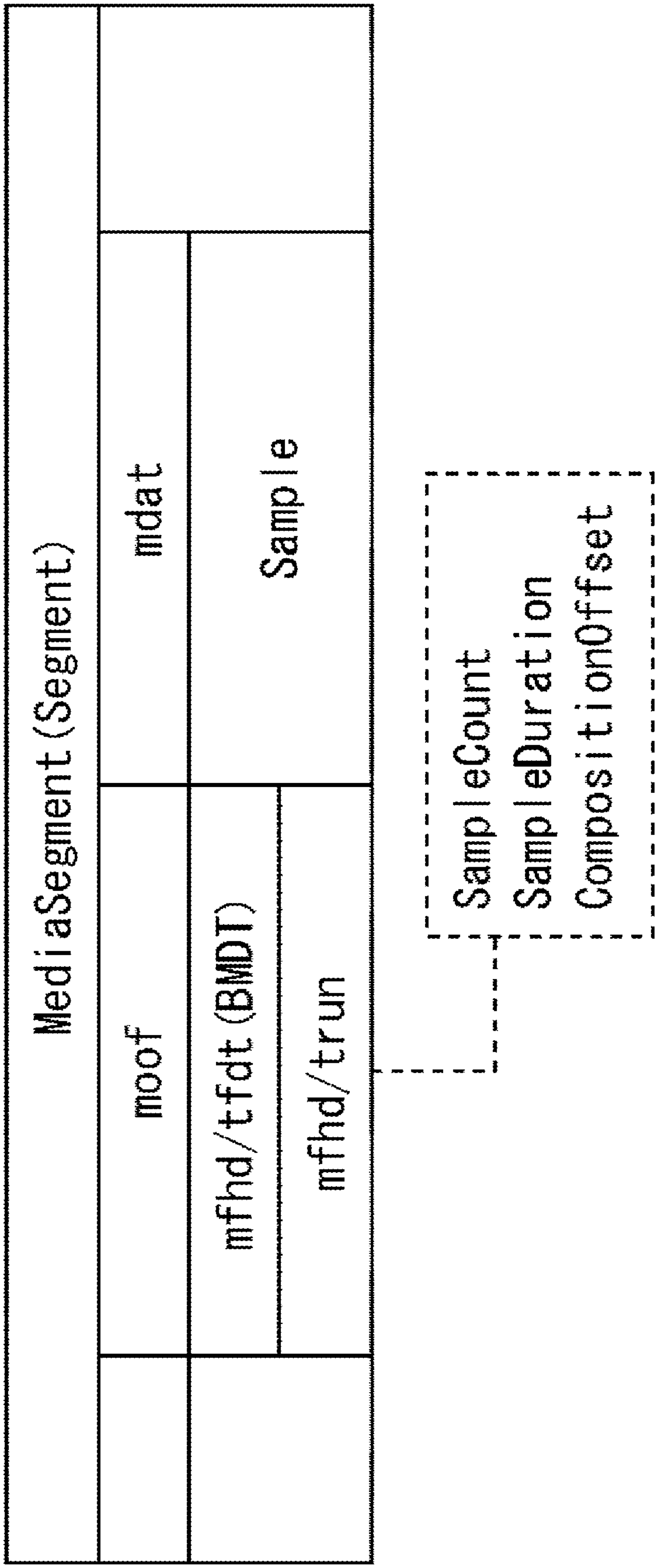
FIG. 9 is a diagram illustrating an MP4 file format.

FIG. 9 is a diagram illustrating a structure of the media segment in the MP4 file format.

The media segment includes boxes (Box) of a segment type (styp), a segment index (sidx), a subsegmentindex (ssix), a movie fragment (moot), and a media data (mdat). The styp box includes version information of a file format specification of a segment file. The sidx box includes index information in the segment. The ssix box includes index information for each sub-segment (level) in the segment. However, in FIG. 9, the styp, sidx, and ssix boxes are not illustrated.

The moof box includes control information about fragmented (component) stream data. The moof box includes a movie fragment header (mfhd) box. Furthermore, the mfhd box includes a track fragment decode time (tfdt) box and a track fragment run (trun) box.

The tfdt box includes Base Media Decode Time (BMDT) representing a decoding start time of a sample. The trun box includes SampleCount representing the number of samples, SampleDuration representing duration of the samples, and information representing CompositionOffset indicating an offset value.

The mdat box stores, as a sample, the fragmented (component) stream data (data body). The sample stores data of the stream (of component) in basic units to be processed.

Note that, in the following description, the samples include a sample of a file (TTML file) in TTML format for displaying a closed caption, and the sample will also be referred to as a TTML sample. Furthermore, the media segments include a media segment having the mdat box including the TTML sample, and the media segment will also be referred to as a TTML segment. Furthermore, in the following description, a segment simply referred to as segment represents a media segment.

(TTML Processing Mode)

Furthermore, when the ROUTE is used as the transport protocol, the TTML file in TTML format may be used for display of the closed caption (CC). However, technologies for displaying a closed caption specified in the TTML file have not been established, and a proposal for displaying a closed caption at desired time has been demanded.

In the present technology, the TTML processing mode for specifying display timing of the closed caption defines a plurality of modes so that the ATSC server 10 includes, in the MPD file, selection information for selection of a specific mode from the plurality of modes. Thus, the ATSC client 20 can display a closed caption specified in the TTML file, at display time according to the specific mode, based on the selection information included in the MPD file.

FIG. 10 is a table illustrating an exemplary TTML processing mode.

Mode 1, mode 2, and mode 3 are defined as the TTML processing mode. Furthermore, mode 2 defines two types of modes, that is, mode 2-1 and mode 2-2.

Mode 1 is a mode for display of the closed caption at time according to time information specified in the TTML file. When mode 1 is set, in the MPD file, as the selection information, "atsc:ttmlMode:ttmlTimeOnly" is specified for a value of a schemeIdUri attribute of an EssentialProperty element or a SupplementalProperty element of the AdaptationSet element.

Note that, in the TTML file, a body element includes a p element which specifies a character string of the closed caption, and the time information such as display start time or display finish time of the closed caption.

Mode 2 is a mode for display of the closed caption at time according to time information defined in the MP4 file format, ignoring the time information specified in the TTML file.

Herein, in mode 2-1 of mode 2, display of the closed caption is started at time according to a BMDT stored in the moof box, and display of the closed caption is continued only during a time period according to SampleDuration stored in the moof box. When mode 2-1 is set, in the MPD file, as the selection information, "atsc:ttmlMode:sampleTimeOnly" is specified for the value of the schemeIdUri attribute of the EssentialProperty element or the SupplementalProperty element of the AdaptationSet element.

Furthermore, in mode 2-2, display of the closed caption is started at time according to a BMDT stored in a moof box corresponding to a mdat box storing a target TTML sample, and display of the closed caption is continued until time according to a BMDT stored in a moof box corresponding to a mdat box storing a next TTML sample. When mode 2-2 is set, in the MPD file, as the selection information, "atsc:ttmlMode:sampleTimeOnlyButTillNext" is specified for the value of the schemeIdUri attribute of the EssentialProperty element or the SupplementalProperty element of the AdaptationSet element.

Mode 3 is a mode for display of the closed caption, ignoring the time information specified in the TTML file and the time information defined in the MP4 file format. In this configuration, in the ATSC client 20, when the TTML file transmitted from the ATSC server 10 thorough the transmission path 30 is acquired, the closed caption specified in the TTML file is immediately displayed. When mode 3 is set, in the MPD file, as the selection information, "atsc:ttmlMode:asap" is specified for the value of the schemeIdUri attribute of the EssentialProperty element or the SupplementalProperty element of the AdaptationSet element.

<3. Specific Example of Operation>

Next, description will be made of exemplary operation of the TTML processing modes in which mode 1, mode 2-1, the mode 2-2, and mode 3 are set.

(1) Mode 1: TTML Time Only

First, exemplary operation of the TTML processing mode in which mode 1 is set will be described with reference to FIGS. 11 and 12. Mode 1 only uses the time information specified in the TTML file.

(Description Example of MPD File)

Figure 11:
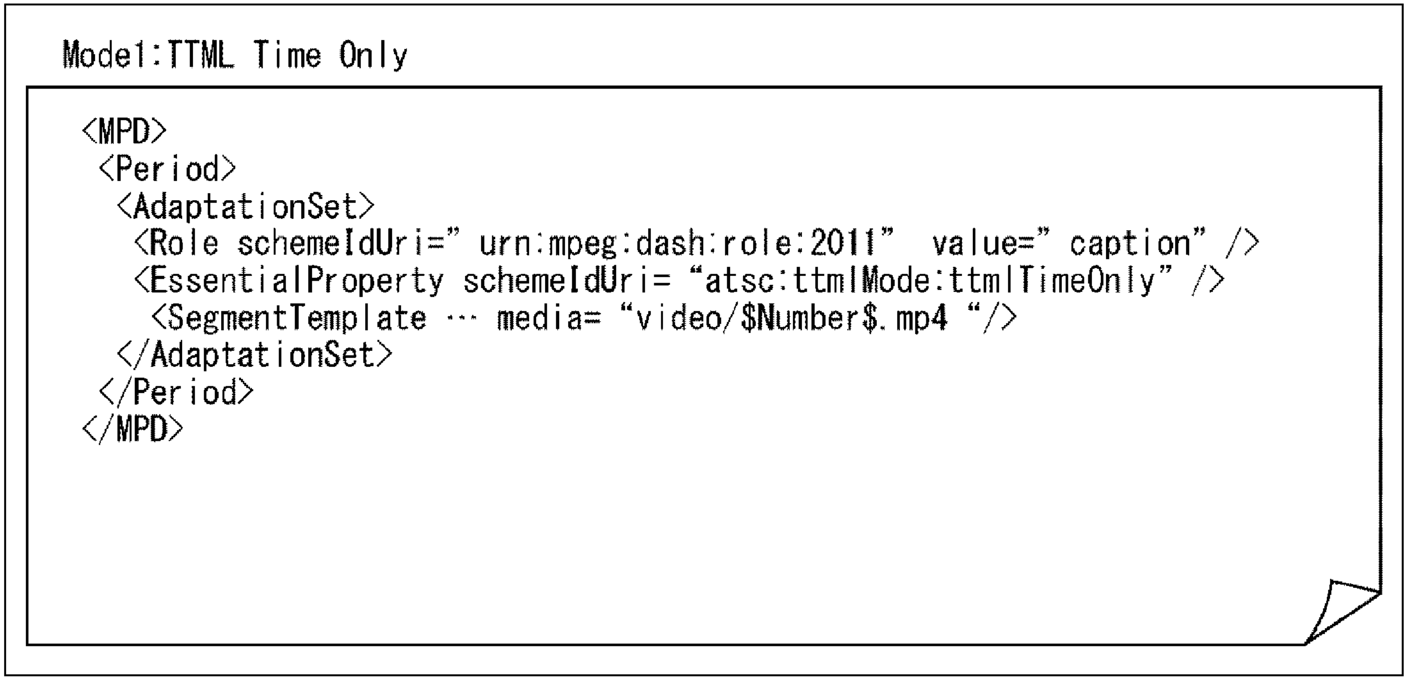
FIG. 11 is a diagram illustrating a description example of an MPD file operated in mode 1.
Figure 12:
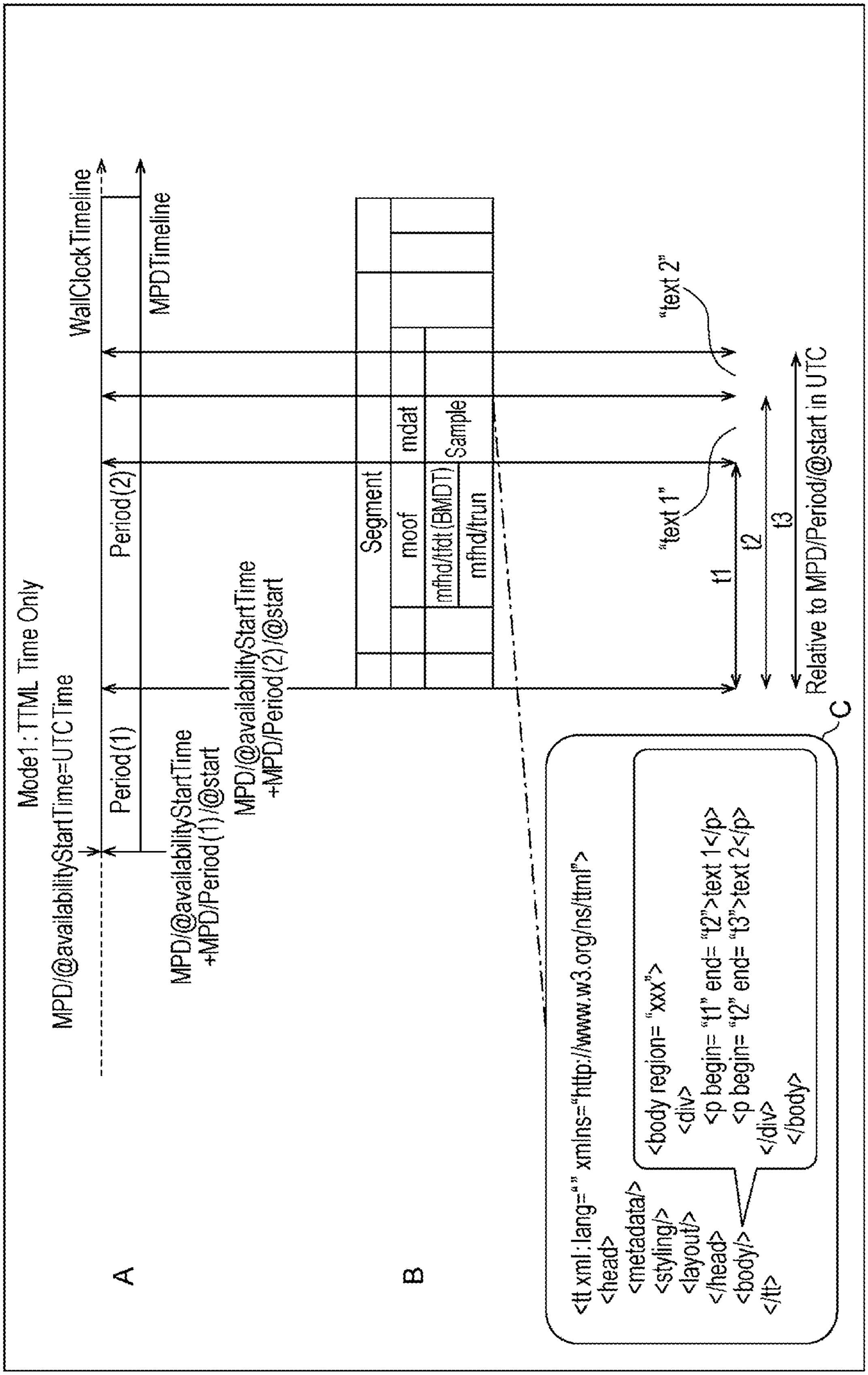
FIG. 12 is a diagram illustrating an example of closed caption display timing upon operation in mode 1.
Figure 14:
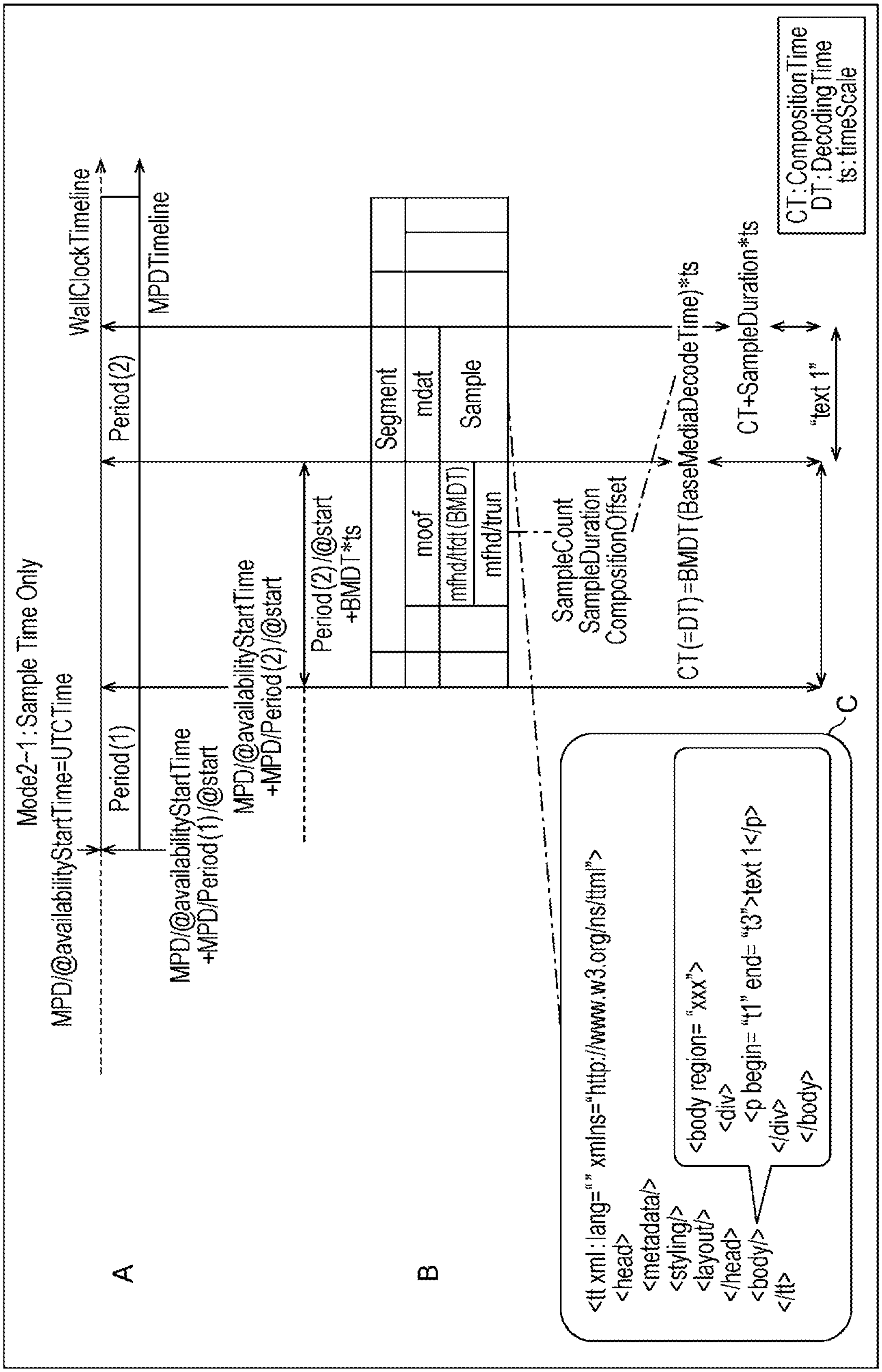
FIG. 14 is a diagram illustrating an example of closed caption display timing upon operation in mode 2-1.
Figure 16:
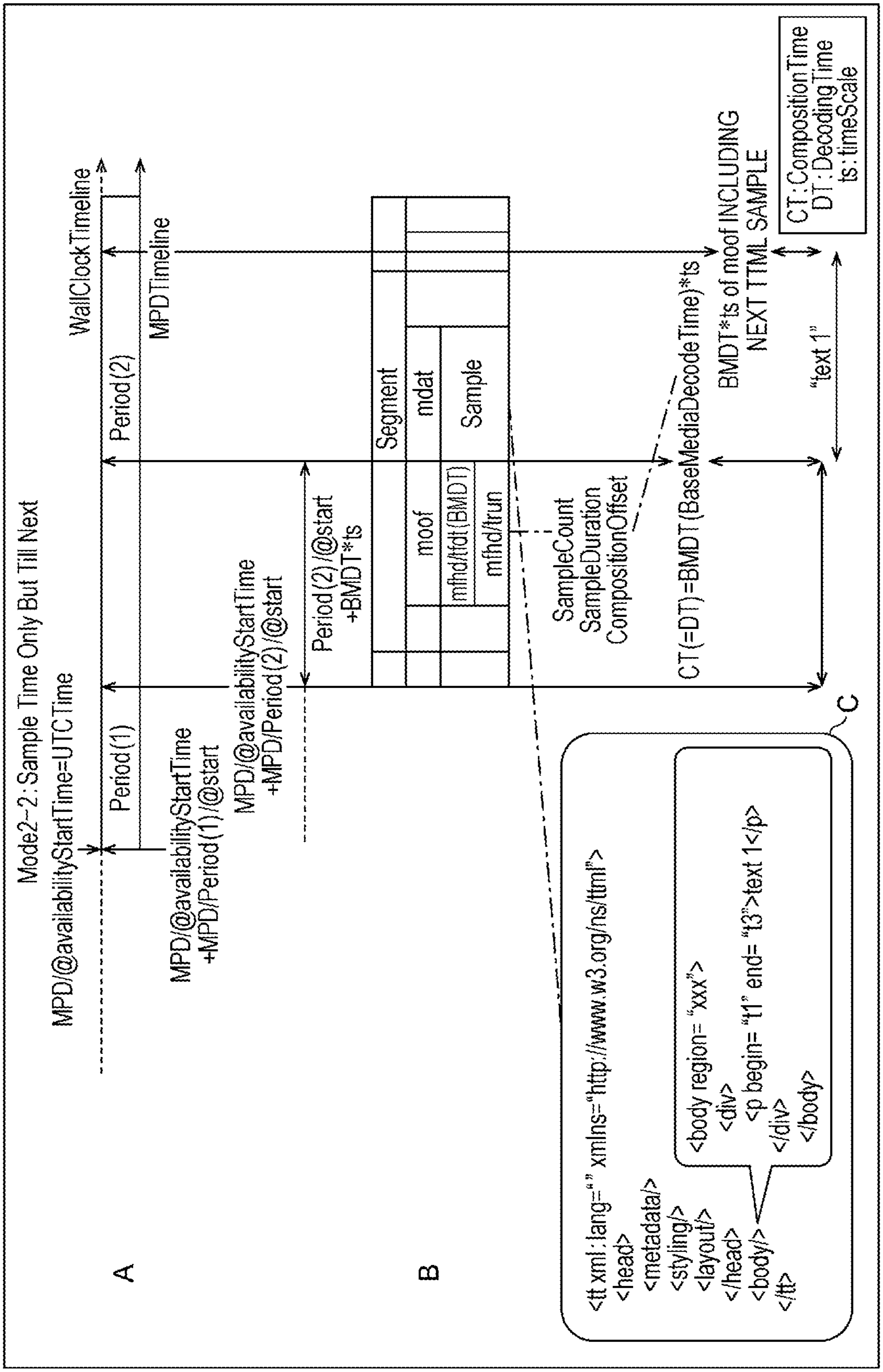
FIG. 16 is a diagram illustrating an example of closed caption display timing upon operation in mode 2-2.

FIG. 11 is a diagram illustrating a description example of an MPD file operated in mode 1.

In the MPD file of FIG. 11, a Role element is arranged in the AdaptationSet element in subordination to the Period element of an MPD element being a root element, "urn:mpeg:dash:role:2011" is specified as the schemeIdUri attribute, and "closed caption" representing a closed caption is specified as a value attribute.

Furthermore, in the AdaptationSet element, "atsc:ttmlMode:ttmlTimeOnly" is specified as the schemeIdUri attribute of the EssentialProperty element. That is, mode 1 is set as the TTML processing mode by an attribute value of the schemeIdUri attribute of the EssentialProperty element.

(Example of Closed Caption Display Timing)

FIGS. 12A to 12C are diagrams illustrating an example of closed caption display timing upon operation in mode 1.

In FIGS. 12A to 12C, FIG. 12A schematically illustrates information about time specified in the MPD file, and FIG. 12B illustrates a structure of the segment (TTML segment). Furthermore, FIG. 12C illustrates a description example of the TTML file obtained from the sample (TTML sample) of the segment (TTML segment) of FIG. 12B. Note that, a time direction is oriented from the left side to the right side in FIGS. 12A to 12C. Furthermore, these relationships are similarly applied to figures described later illustrating other modes.

As illustrated in FIG. 12A, in the MPD file, streaming start time according to coordinated universal time (UTC) is specified for an availabilityStartTime attribute of the MPD element being the root element. Furthermore, in the MPD file, Period (1), Period (2), . . . are specified as the Period element, and in the Period elements, start time is specified for each Period (period), as a start attribute.

That is, in the MPD file, the sum of start time (time on WallClock time axis) specified in the availabilityStartTime attribute, and time (time on MPD time axis) specified in the Period element represents time at the head of each Period. For example, time at the head of Period(2) is obtained based on the sum (MPD/@availabilityStartTime+MPD/Period(2)/@start) of the start time specified in the availabilityStartTime attribute (MPD/@availabilityStartTime), and the start time of Period(2) (MPD/Period(2)/@start).

FIG. 12B schematically illustrates a segment in Period (2). The segment is the TTML segment having the mdat box storing the TTML sample as the sample. From the TTML sample stored in the mdat box from the TTML segment, the TTML file is obtained. Note that time information (BMDT, SampleDuration, or the like) stored in the moof box is ignored, in mode 1.

FIG. 12C illustrates the description example of the TTML file. In the TTML file, a head element includes an element such as a styling element or a layout element which specifies color or font, or a display position of characters displayed as the closed caption. Furthermore, in the TTML file, the p element in the body element specifies the character string of the closed caption, and the time information such as the display start time or the display finish time of the closed caption.

Specifically, the TTML file of FIG. 12C has description of two p elements, and out of the two p elements, an upper p element has description of a character string "text1" between a begin tag and an end tag. Furthermore, in the upper p element, "t1" is specified as a begin attribute for setting the display start time, and "t2"is specified as an end attribute for setting the display finish time.

Furthermore, in the TTML file of FIG. 12C, a lower p element has description of a character string "text2" between the begin tag and the end tag. Furthermore, in the lower p element, "t2" is specified as the begin attribute, and "t3" is specified as the end attribute.

Herein, in the MPD file (FIG. 11) acquired upon operation, "atsc:ttmlMode:ttmlTimeOnly" is specified as the schemeIdUri attribute of the EssentialProperty element of the AdaptationSet element, and mode 1 is set as the TTML processing mode. When mode 1 is set, the closed caption is displayed at time according to the time information described in the TTML file, and thus, the closed caption is displayed at time according to values of the begin attribute and the end attribute of the p element.

Specifically, as illustrated in FIGS. 12A to 12C, displaying a closed caption "text1" specified in the upper p element is started, after a time period t1 based on time at the head of Period(2) according to the sum (MPD/@availabilityStartTime+MPD Period(2) @start) of the start time specified in the availabilityStartTime attribute and the start time of Period(2), display of the closed caption "text1" is continued during a time period t2, and display of the closed caption "text1" is finished after the time period t2. Furthermore, displaying a closed caption "text2" specified in the lower p element is started, after the time period t2 based on time at the head of Period(2), displaying a closed caption "text2" is continued during a time period t3, and display of the closed caption "text2" is finished after the time period t3.

Accordingly, in the ATSC client 20, when content such as a TV program is reproduced, the closed caption "text1" is displayed superimposed on the video, after the time period t1 and during the time period t2, based on time at the head of Period(2), and the closed caption "text2" is displayed superimposed on the video, after the time period t2 and during the time period t3.

This is the end of the description of the exemplary operation of the TTML processing mode in which mode 1 is set. In mode 1, the time information specified in the TTML file (values of the begin attribute and the end attribute of the p element) is used to start display of the closed caption according to the time period set for the begin attribute, and to finish display of the closed caption according to the time period set for the end attribute, and the closed caption can be displayed at desired time.

For example, in the ATSC server 10, when a package of the video, sound, and closed caption recorded in a studio or the like is produced as content, and the content is distributed to a plurality of ATSC clients 20 through the transmission path 30, it is considered suitable to employ operation for display of the closed caption specified in the p element of the TTML file, at time according to the time period indicated by the begin attribute and the end attribute of the p element, based on a time period relative to the head of the content. For achieving such operation, mode 1 is set as the TTML processing mode in the MPD file, and thus, the closed caption is displayed at time according to the time period indicated by the begin attribute and the end attribute of the p element of the TTML file, in the ATSC client 20.

(2) Mode 2: Sample Time Only

Next, exemplary operation of the TTML processing mode in which mode 2 is set will be described with reference to FIGS. 13 to 16. Mode 2 uses the time information defined in the MP4 file format (time information for each TTML sample), ignoring the time information specified in the TTML file. Mode 2-1 and mode 2-2 will be sequentially described herein, as mode 2.

(2-1) Mode 2-1: Sample Time Only (Description Example of MPD File)

FIG. 13 is a diagram illustrating a description example of an MPD file operated in mode 2-1.

In the MPD file of FIG. 13, "atsc:ttmlMode:sampleTimeOnly" is specified as the schemeIdUri attribute of the EssentialProperty element, for the AdaptationSet element in subordination to the Period element of an MPD element being a root element. That is, mode 2-1 is set as the TTML processing mode by the attribute value of the schemeIdUri attribute of the EssentialProperty element.

(Example of Closed Caption Display Timing)

FIGS. 14A to 14C are diagrams illustrating an example of closed caption display timing upon operation in mode 2-1.

As illustrated in FIG. 14A, in the MPD file, the streaming start time is specified for the availabilityStartTime attribute of the MPD element. Furthermore, in the MPD file, Period (1), Period (2), . . . are specified as the Period element, and in the Period elements, the start time is specified for each Period (period), as the start attribute. Time at the head of Period(2) is obtained here, based on the sum (MPD/@availabilityStartTime+MPD/Period(2)/@start) of the start time specified in the availabilityStartTime attribute and the start time of Period(2).

FIG. 14B schematically illustrates the TTML segment in Period (2). The TTML file (FIG. 14C) can be acquired from the TTML sample stored in the mdat box of the TTML segment, but, in the MPD file (FIG. 13) acquired upon the operation, "atsc:ttmlMode:sampleTimeOnly" is specified in the schemeIdUri attribute of the EssentialProperty element, and mode 2-1 is set as the TTML processing mode. Therefore, the time information specified in the p element of the TTML file ("t1" of the begin attribute and "t3" of the end attribute) is ignored.

That is, in mode 2-1, the time information stored in the moof box of the TTML segment (time information for each TTML sample) is used, ignoring the time information specified in the TTML file. However, one moof box (time information stored therein) is assumed here to correspond to one TTML sample (TTML sample stored in the mdat box), in the TTML segment.

Specifically, as illustrated in FIGS. 14A to 14C, display of the closed caption “text1” specified in the p element of the TTML file is started, after a time period (BMDT×ts) according to the BMDT stored in the moof box (moof/mfhd/tfdt), based on time at the head of Period(2) according to the sum (MPD/@availabilityStartTime+MPD/Period(2)/@start) of the start time specified in the availabilityStartTime attribute of the MPD file and the start time of Period(2).

The BMDT (Base Media Decode Time) represents a time period from time at the head of Period(2) to time at which decode of the TTML sample is started, that is, offset. Furthermore, ts by which the BMDT is multiplied represents a time scale, and is used to convert a value of the BMDT to a value on the MPD time axis.

Display of the closed caption “text1” is continued, during the time (SampleDuration×ts) according to SampleDuration stored in the moof box (moof/mfhd/trun), and display of the closed caption “text1” is finished after the time period according to SampleDuration.

However, SampleDuration represents duration of the TTML sample. Furthermore, ts by which SampleDuration is multiplied is used to convert a value of SampleDuration to a value on the MPD time axis.

Therefore, in the ATSC client 20, while the content such as a TV program is reproduced, the closed caption “text1” is displayed superimposed on the video, based on time at the head of Period(2) after passage of the time period according to the BMDT stored in the moof box, and during the time period according to SampleDuration.

This is the end of the description of the exemplary operation of the TTML processing mode in which mode 2-1 is set. In mode 2-1, time information defined in the MP4 file format (BMDT and SampleDuration for each TTML sample) is used to start display of the closed caption at time according to the BMDT of the TTML sample, and continue display of the closed caption only during the time period according to SampleDuration, and the closed caption can be displayed at desired time.

(2-2) Mode 2-2: Sample Time Only But Till Next (Description Example of MPD File)

FIG. 15 is a diagram illustrating a description example of the MPD file operated in mode 2-2.

In the MPD file of FIG. 15, in the AdaptationSet element in subordination to the Period element of an MPD element being a root element, “atsc:ttmlMode:sampleTimeOnlyButTillNext” is specified as the schemeIdUri attribute of the EssentialProperty element. That is, mode 2-2 is set as the TTML processing mode by the attribute value of the schemeIdUri attribute of the EssentialProperty element.

(Example of Closed Caption Display Timing)

FIGS. 16A to 16C are diagrams illustrating an example of closed caption display timing upon operation in mode 2-2.

As illustrated in FIG. 16A, in the MPD file, the streaming start time is specified for the availabilityStartTime attribute of the MPD element. Furthermore, in the MPD file, Period (1), Period (2), . . . are specified as the Period element, and in the Period elements, start time is specified for each Period (period), as a start attribute. Time at the head of Period(2) is obtained here, based on the sum (MPD/@availabilityStartTime+MPD/Period(2)/@start) of the start time specified in the availabilityStartTime attribute and the start time of Period(2).

FIG. 16B schematically illustrates the TTML segment in Period (2). The TTML file (FIG. 16C) can be acquired from the TTML sample stored in the mdat box of the TTML segment, but, in the MPD file (FIG. 15) acquired upon the operation, “atsc:ttmlMode:sampleTimeOnlyButTillNext” is specified in the schemeIdUri attribute of the EssentialProperty element, and mode 2-2 is set as the TTML processing mode. Therefore, the time information specified in the p element of the TTML file (“t1” of the begin attribute and “t3” of the end attribute) is ignored.

That is, in mode 2-2, the time information stored in the moof box of the TTML segment (time information for each TTML sample) is used, ignoring the time information specified in the TTML file. However, one moof box (time information stored therein) is assumed here to correspond to one TTML sample (TTML sample stored in the mdat box), in the TTML segment.

Specifically, as illustrated in FIGS. 16A to 16C, display of the closed caption “text1” specified in the p element of the TTML file is started, after the passage of the time period (BMDT×ts) according to the BMDT stored in the moof box corresponding to the mdat box storing the target TTML sample (TTML sample of the TTML file specifying a target closed caption), based on time at the head of Period(2) according to the sum (MPD/@availabilityStartTime+MPD/Period(2)/@start) of the start time specified in the availabilityStartTime attribute of the MPD file and the start time of Period(2).

The display of the closed caption “text1” is continued, until the passage of a time period (BMDT×ts) according to the BMDT stored in a moof box corresponding to an mdat box storing the next TTML sample (a TTML sample of a TTML file specifying a next closed caption), and display of the closed caption “text1” is finished after the passage of the time period (BMDT×ts) according to the BMDT.

Therefore, in the ATSC client 20, while the content such as a TV program is reproduced, the closed caption “text1” is displayed superimposed on the video, based on time at the head of Period(2) after the time period according to the BMDT of (the moof box of) a TTML segment including the target TTML sample, and until passage of the time period according to the BMDT of (the moof box of) the TTML segment including the next TTML sample.

Note that, although not illustrated in FIGS. 16A to 16C, when the next TTML sample (TTML sample of the TTML file specifying the next closed caption) is acquired, display of the closed caption “text1” is finished, and display of the closed caption (e.g., “text2”) specified in the next TTML sample (TTML file) is started.

This is the end of the description of the exemplary operation of the TTML processing mode in which mode 2-2 is set. In mode 2-2, time information defined in the MP4 file format (BMDT for each TTML sample) is used to start display of the closed caption at time according to the BMDT of the target TTML sample, and continue display of the closed caption until time according to the BMDT of the next TTML sample, and the closed caption can be displayed at desired time. Note that mode 2-1 and mode 2-2 are common in specification of timing of starting closed caption display, at time according to BMDT, but are different in specification of timing of finishing the closed caption being displayed, between based on the time period according to SampleDuration and time according to the BMDT.

For example, when a content provider or the like produces content of a video and sound package, and a broadcaster or the like adds a closed caption to the content later or sets closed caption display timing, the closed caption display timing seems to be operationally suitably specified in the time information defined in the MP4 file format (time information for each TTML sample), rather than in the TTML file. For achieving such operation, mode 2-1 and mode 2-2 are set as the TTML processing mode in the MPD file, and thus, the closed caption is displayed at time according to the time information defined in the MP4 file format (time information for each TTML sample), in the ATSC client 20.

(3) Mode 3: Asap

Next, exemplary operation of the TTML processing mode in which mode 3 is set will be described with reference to FIGS. 17 and 18. Mode 3 performs processing for display of the closed caption immediately after the TTML file (TTML sample) is acquired, ignoring the time information specified in the TTML file, and the time information defined in the MP4 file format (time information for each TTML sample).

(Description Example of MPD File)

Figure 17:
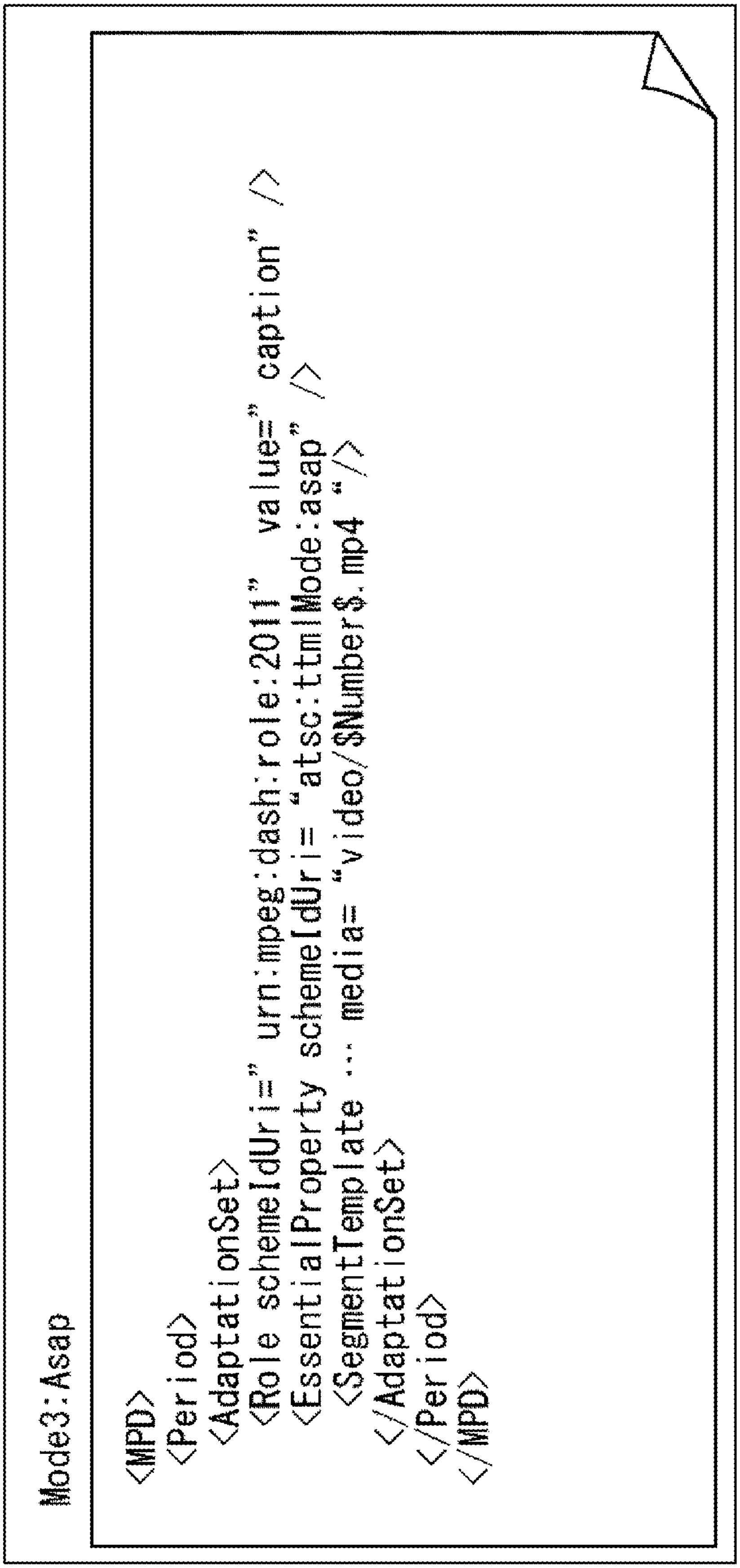
FIG. 17 is a diagram illustrating a description example of an MPD file operated in mode 3.
Figure 18:
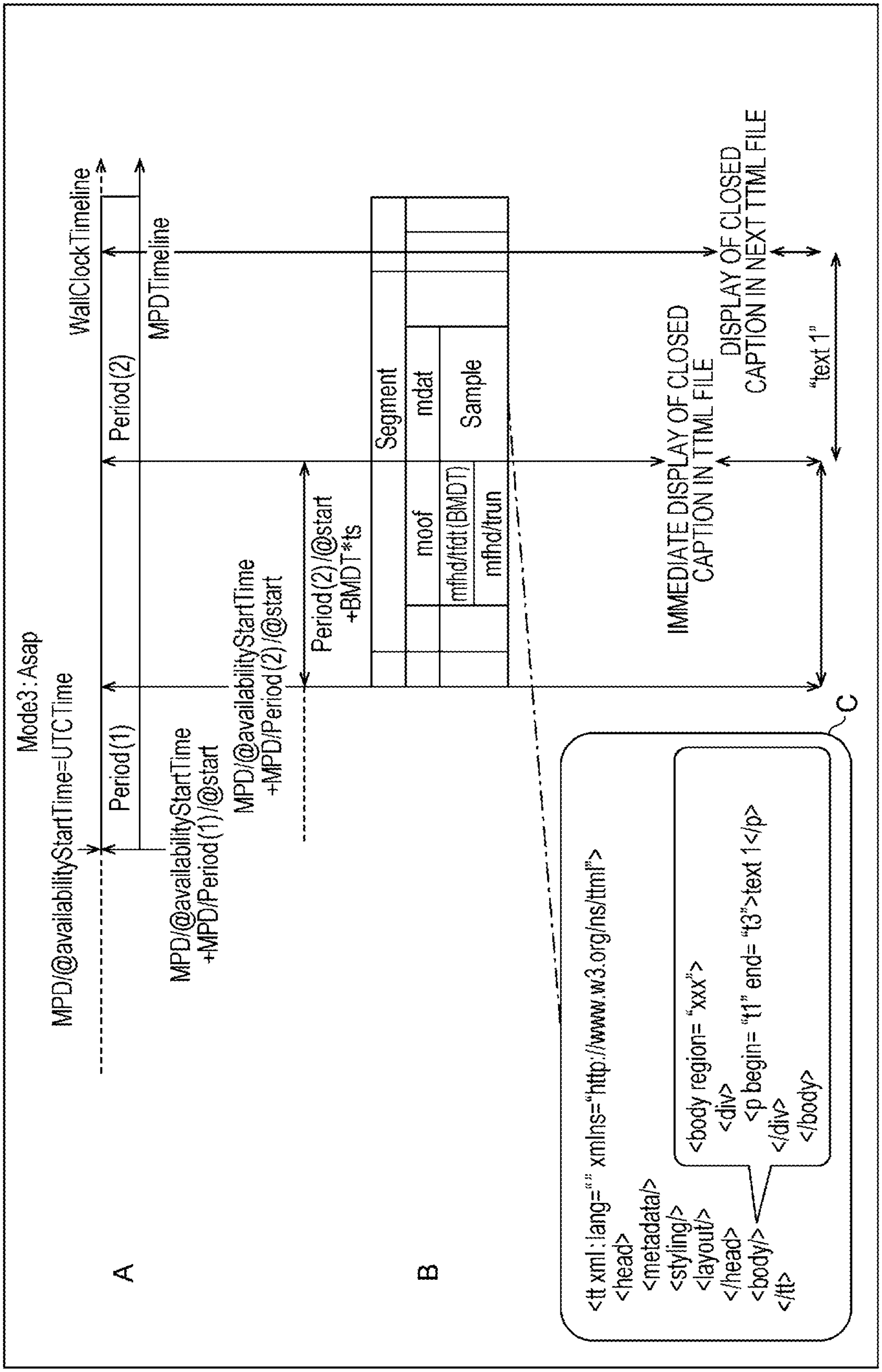
FIG. 18 is a diagram illustrating an example of closed caption display timing upon operation in mode 3.

FIG. 17 is a diagram illustrating a description example of an MPD file operated in mode 3.

In the MPD file of FIG. 17, in the AdaptationSet element in subordination to the Period element of an MPD element being a root element, "atsc:ttmlMode:asap" is specified as the schemeIdUri attribute of the EssentialProperty element. That is, mode 3 is set as the TTML processing mode by the attribute value of the schemeIdUri attribute of the EssentialProperty element.

(Example of Closed Caption Display Timing)

FIGS. 18A to 18C are diagrams illustrating an example of closed caption display timing upon operation in mode 3.

As illustrated in FIG. 18A, in the MPD file, the streaming start time is specified for the availabilityStartTime attribute of the MPD element. Furthermore, in the MPD file, Period (1), Period (2), . . . are specified as the Period element, and in the Period elements, start time is specified for each Period (period), as a start attribute.

FIG. 18B schematically illustrates the TTML segment in Period (2). The TTML file (FIG. 18C) can be acquired from the TTML sample stored in the mdat box of the TTML segment, but, in the MPD file (FIG. 17) acquired upon the operation, "atsc:ttmlMode:asap" is specified in the schemeIdUri attribute of the EssentialProperty element, and mode 3 is set as the TTML processing mode. Therefore, the time information specified in the p element of the TTML file ("t1" of the begin attribute and "t3" of the end attribute) is ignored. Furthermore, when mode 3 is set as the TTML processing mode, the time information (BMDT, SampleDuration, or the like) is also ignored which is stored in the moof box of the TTML segment.

That is, in mode 3, immediately after the TTML file (TTML sample) is acquired, the processing is performed to display the closed caption specified in the TTML file, ignoring the time information specified in the TTML file and the time information for each TTML sample.

Specifically, as illustrated in FIGS. 18A to 18C, in the ATSC client 20, when the TTML segment is acquired, the TTML file is acquired from the TTML sample of the TTML segment, the TTML file is processed immediately, and display of the closed caption "text1" specified in the p element is started, ignoring the values of the begin attribute and the end attribute of the p element.

display of the closed caption "text1" is continued, until a TTML segment including a next TTML file (TTML sample) is acquired, and display of the closed caption "text1" is finished when the TTML segment including the next TTML file (TTML sample) is acquired.

Therefore, in the ATSC client 20, when the content such as a TV program is reproduced, the closed caption "text1" specified in the p attribute of the target TTML file is displayed superimposed on the video, after the TTML segment including the TTML sample of the target TTML file is acquired, and before the TTML segment including the TTML sample of the next TTML file is acquired.

Note that, although not illustrated in FIGS. 18A to 18C, when the next TTML file is acquired, display of the closed caption "text1" is finished, and display of the closed caption specified in the next TTML file (e.g., "text2") is started.

This is the end of the description of the exemplary operation of the TTML processing mode in which mode 3 is set. In mode 3, when the TTML file (TTML sample) is acquired, the closed caption specified in the TTML file is displayed immediately, ignoring the time information specified in the TTML file and the time information defined in the MP4 file format (time information for each TTML sample), and the closed caption can be displayed at desired time.

For example, in the ATSC server 10, when content of live broadcast such as sports broadcast is distributed to a plurality of ATSC clients 20 through the transmission path 30, minimum deviation between the live video and the closed caption assumed to be delayed from the live video is demanded. Thus, it is considered suitable to employ operation for display of the closed caption immediately after the ATSC client 20 receives the TTML file with best effort, without specifying a time period for display of the closed caption. For achieving such operation, mode 3 is set as the TTML processing mode in the MPD file, and thus, the closed caption is displayed immediately after the TTML file is received, in the ATSC client 20.

<4. Configurations of Apparatuses>

Next, detailed configurations of apparatuses constituting the transmission system 1 of FIG. 1, with reference to FIGS. 19 to 22.

(Configuration of ATSC Server)

Figure 19:
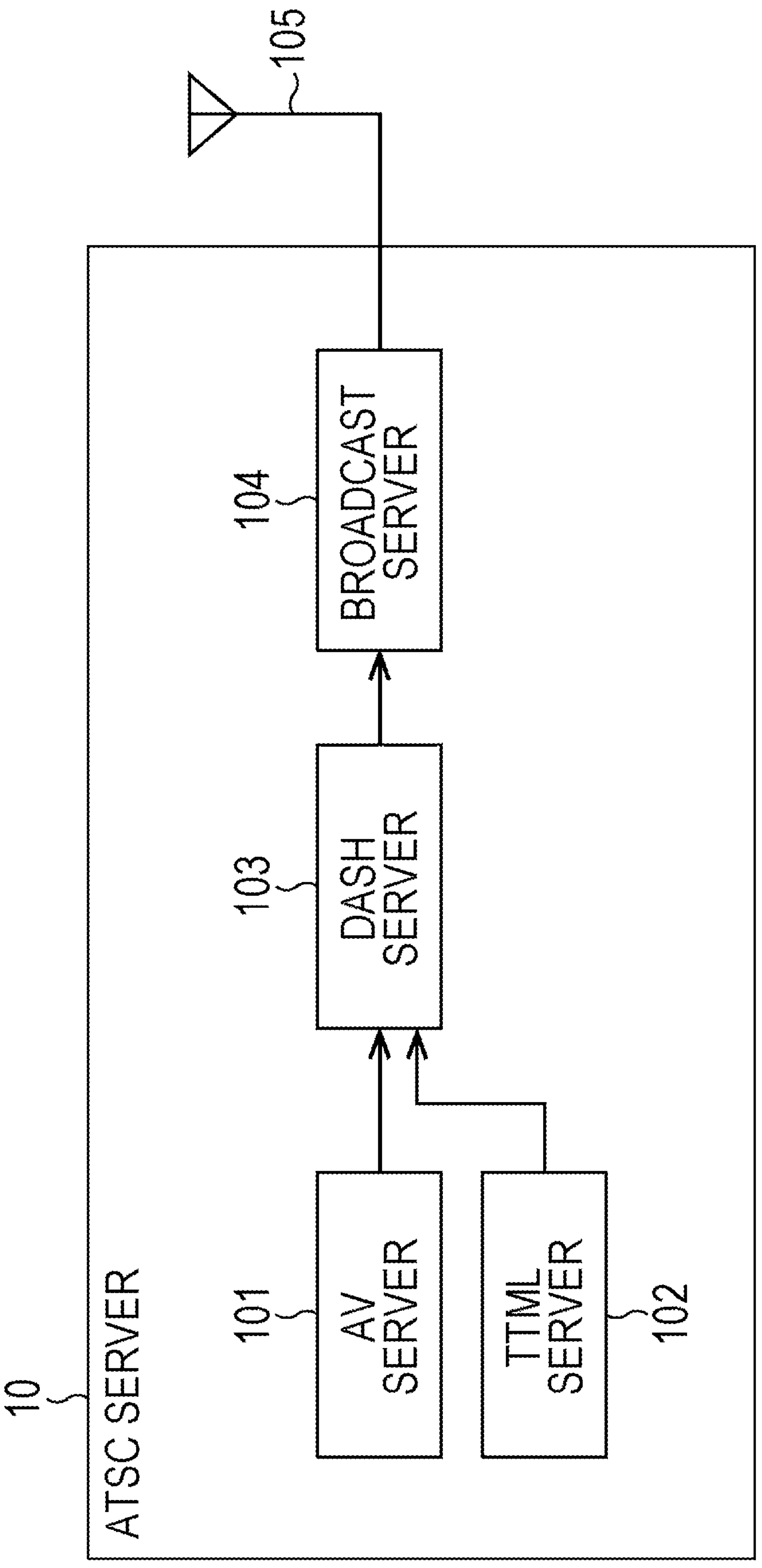
FIG. 19 is a diagram illustrating an exemplary configuration of an ATSC server.

FIG. 19 is a diagram illustrating an exemplary configuration of the ATSC server 10 of FIG. 1.

In FIG. 19, the ATSC server 10 includes an AV server 101, a TTML server 102, a DASH server 103, and a broadcast server 104. For example, the AV server 101, the TTML server 102, and the DASH server 103 are provided by a service provider, such as a content provider or a broadcaster. Furthermore, for example, the broadcast server 104 is provided by the service provider, such as the broadcaster or the like.

The AV server 101 acquires and processes the video and audio (stream) data constituting the content, and provides the data to the DASH server 103.

The TTML server 102 generates and processes the TTML file as closed caption information superimposed on the video of the content, and provides the TTML file to the DASH server 103.

The DASH server 103 generates the MPD file. Furthermore, the DASH server 103 processes the video and audio data provided from the AV server 101, and the TTML file supplied from the TTML server 102, and generates the segment (segment data). The DASH server 103 provides the MPD file and the segment data to the broadcast server 104.

The broadcast server 104 generates signaling information such as the LLS information or the SLS information. Furthermore, the broadcast server 104 transmits the segment data (including the TTML file) or the signaling information (including the MPD file), as the digital broadcasting signal, through an antenna 105.

(Detailed Configuration of ATSC Server)

Figure 20:
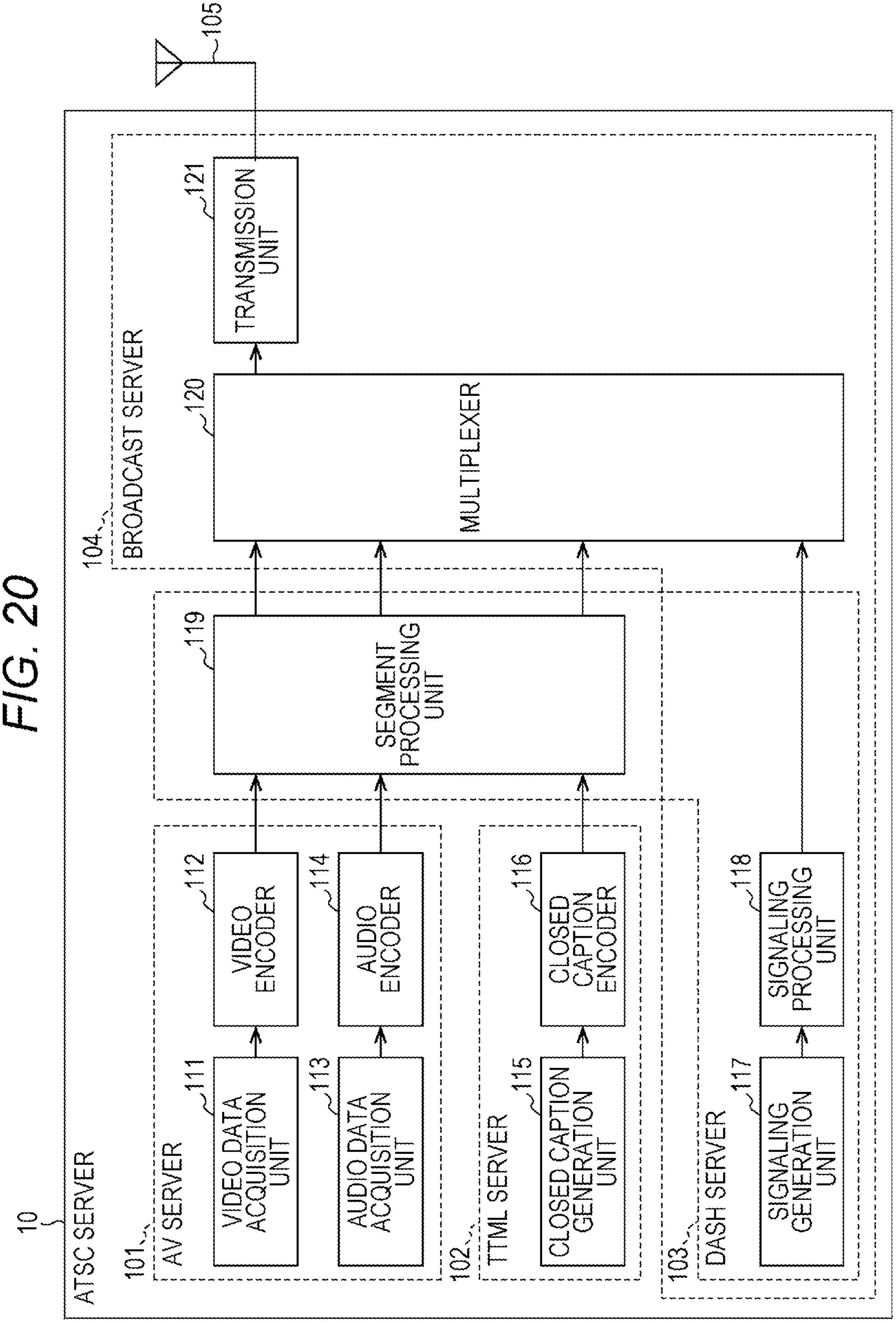
FIG. 20 is a diagram illustrating a detailed exemplary configuration of the ATSC server.

FIG. 20 is a diagram illustrating a detailed exemplary configuration of the ATSC server 10 of FIG. 19.

In FIG. 20, the ATSC server 10 includes a video data acquisition unit 111, a video encoder 112, an audio data acquisition unit 113, an audio encoder 114, a closed caption generation unit 115, a closed caption encoder 116, a signaling generation unit 117, a signaling processing unit 118, a segment processing unit 119, a multiplexer 120, and a transmission unit 121.

Herein, blocks achieving the function of the ATSC server 10 are included in any configuration of the AV server 101 to the broadcast server 104 of FIG. 19, but for example, can have the following configuration. That is, in FIG. 20, the video data acquisition unit 111, the video encoder 112, the audio data acquisition unit 113, and the audio encoder 114 are included in a configuration of the AV server 101.

Furthermore, in FIG. 20, the closed caption generation unit 115 and the closed caption encoder 116 are included in a configuration of the TTML server 102. In FIG. 20, the signaling generation unit 117, the signaling processing unit 118, and the segment processing unit 119 are included in a configuration of the DASH server 103. Furthermore, in FIG. 20, the signaling generation unit 117, the signaling processing unit 118, the multiplexer 120, and the transmission unit 121 are included in a configuration of the broadcast server 104.

However, a configuration illustrated in FIG. 20 is an example, the blocks constituting the servers can be arbitrarily combined for example to configure a server having both functions of the AV server 101 and the TTML server 102, or a server having both functions of the DASH server 103 and the broadcast server 104, and another configuration other than the configuration of FIG. 20 can be adopted.

The video data acquisition unit 111 acquires video data of the content from an external server, camera, recording medium, or the like, and supplies the video data to the video encoder 112. The video encoder 112 encodes the video data supplied from the video data acquisition unit 111 in accordance with a predetermined encoding method, and supplies the video data to the segment processing unit 119.

The audio data acquisition unit 113 acquires audio data of the content from an external server, microphone, recording medium, or the like, and supplies the audio data to the audio encoder 114. The audio encoder 114 encodes the audio data supplied from the audio data acquisition unit 113 in accordance with a predetermined encoding method, and supplies the audio data to the segment processing unit 119.

The closed caption generation unit 115 generates, as closed caption data, the TTML file in TTML format, and supplies the TTML file to the closed caption encoder 116. The closed caption encoder 116 encodes the closed caption data supplied from the closed caption generation unit 115 in accordance with a predetermined encoding method, and supplies the closed caption data to the segment processing unit 119.

The signaling generation unit 117 generates the signaling information, and supplies the signaling information to the signaling processing unit 118. The signaling processing unit 118 processes the signaling information supplied from the signaling generation unit 117, and supplies the signaling information to the multiplexer 120. For example, the LLS information such as the SLT metadata, or the SLS information such as the USD metadata, the LSID metadata, or the MPD metadata (MPD file) is generated and processed here. However, the MPD file includes the selection information for selection of a TTML processing mode.

The segment processing unit 119 generates the segment (segment data) in accordance with the MP4 file format, based on the video data supplied from the video encoder 112, the audio data supplied from the audio encoder 114, and the closed caption data supplied from the closed caption encoder 116, and supplies the segment to the multiplexer 120.

The multiplexer 120 multiplexes the segment data supplied from the segment processing unit 119 and the signaling information supplied from the signaling processing unit 118, and supplies the thereby obtained multiplexed stream to the transmission unit 121.

The transmission unit 121 transmits the multiplexed stream supplied from the multiplexer 120, as the digital broadcast wave (digital broadcasting signal), through the antenna 105.

The ATSC server 10 is configured as described above.

(Detailed Configuration of ATSC Client)

Figure 21:
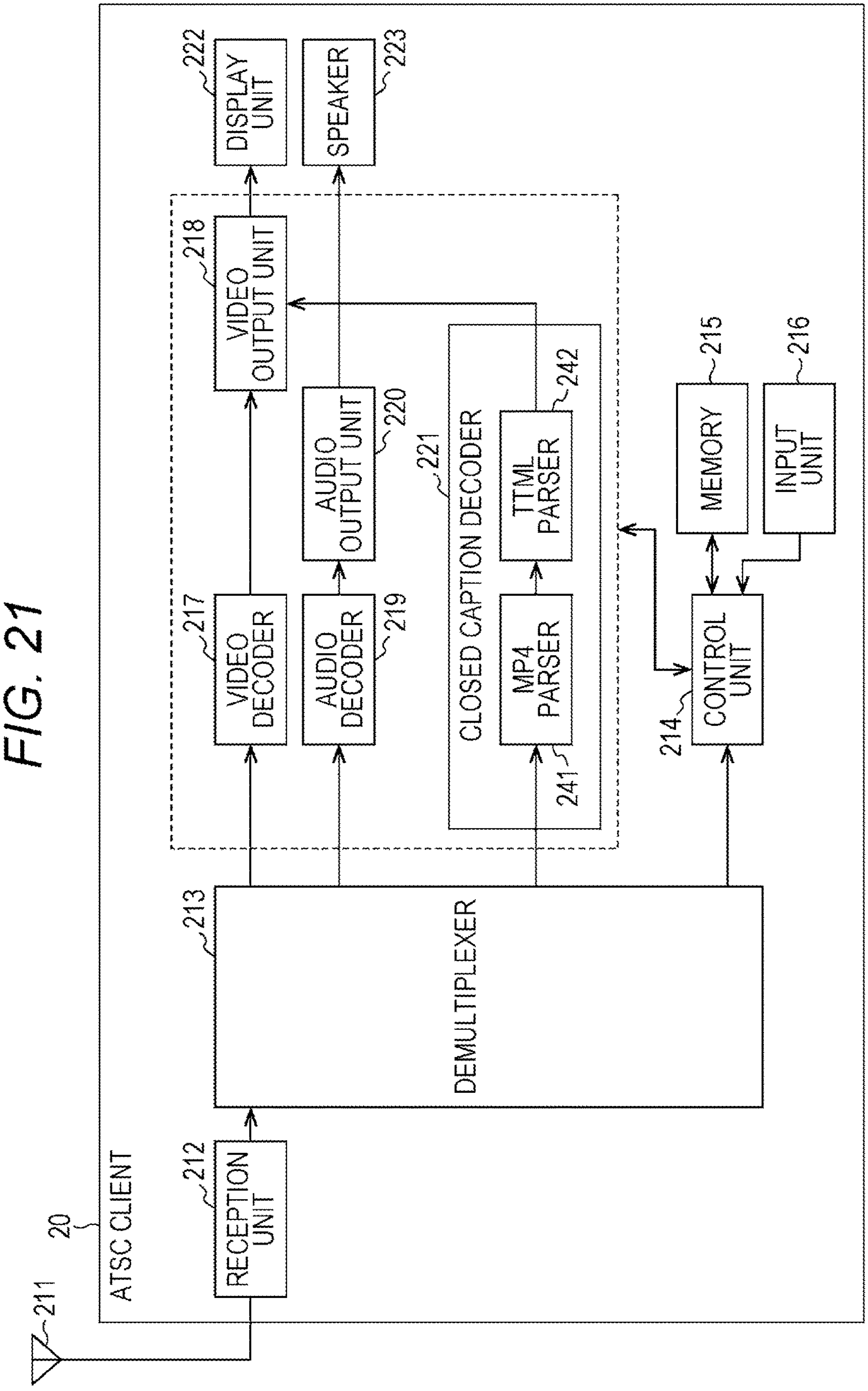
FIG. 21 is a diagram illustrating a detailed exemplary configuration of an ATSC client.

FIG. 21 is a diagram illustrating a detailed exemplary configuration of an ATSC client 20 of FIG. 1.

In FIG. 21, the ATSC client 20 includes a reception unit 212, a demultiplexer 213, a control unit 214, a memory 215, an input unit 216, a video decoder 217, a video output unit 218, an audio decoder 219, an audio output unit 220, a closed caption decoder 221, a display unit 222, and a speaker 223. Note that FIG. 21 illustrates a configuration including the display unit 222 and the speaker 223, but a configuration not including the display unit 222 and the speaker 223 may be employed.

The reception unit 212 extracts a signal according to user's selection operation, from the digital broadcast wave (digital broadcasting signal) received through an antenna 211, and demodulates the signal, and then supplies the thereby obtained multiplexed stream by the demodulation to the demultiplexer 213.

The demultiplexer 213 separates the multiplexed stream supplied from the reception unit 212 into the audio, video, or closed caption stream, and the signaling information. The demultiplexer 213 supplies the video data to the video decoder 217, the audio data to the audio decoder 219, the closed caption data to the closed caption decoder 221, and the signaling information to the control unit 214. Note that the video, audio, or closed caption data is defined as the segment (segment data) in accordance with the MP4 file format.

The control unit 214 controls the operation of units of the ATSC client 20. Furthermore, the control unit 214 controls the operation of the units based on the signaling information supplied from the demultiplexer 213, in order to reproduce the content.

The memory 215 is non-volatile memory such as non-volatile RAM (NVRAM), and records various data according to control by the control unit 214. The input unit 216 supplies an operation signal to the control unit 214 according to user's operation.

The video decoder 217 decodes the video data supplied from the demultiplexer 213 in accordance with a predetermined decoding method, and supplies the video data to the video output unit 218. The video output unit 218 outputs the video data supplied from the video decoder 217 to the display unit 222. Therefore, the video of the content is displayed on the display unit 222, according to the user's selection operation.

The audio decoder 219 decodes the audio data supplied from the demultiplexer 213 in accordance with a predetermined decoding method, and supplies the audio data to the audio output unit 220. The audio output unit 220 outputs the audio data supplied from the audio decoder 219 to the speaker 223. Therefore, sound of the content is output from the speaker 223, according to the user's selection operation.

The closed caption decoder 221 decodes the closed caption data supplied from the demultiplexer 213 in accordance with a predetermined decoding method, and supplies the closed caption data to the video output unit 218. The video output unit 218 displays the closed caption corresponding to the closed caption data supplied from the closed caption decoder 221 to be superimposed on the video corresponding to the video data supplied from the video decoder 217. Therefore, the closed caption superimposed on the video of the content is displayed on the display unit 222, according to the user's selection operation.

The closed caption decoder 221 includes an MP4 parser 241 and a TTML parser 242. The MP4 parser 241 parses the segment data (TTML segment) from the demultiplexer 213, and supplies the thereby obtained TTML file to the TTML parser 242. The TTML parser 242 parses the TTML file supplied from the MP4 parser 241, and supplies thereby obtained information for display of the closed caption to the video output unit 218.

(Exemplary Software Configuration of ATSC Client)

Figure 22:
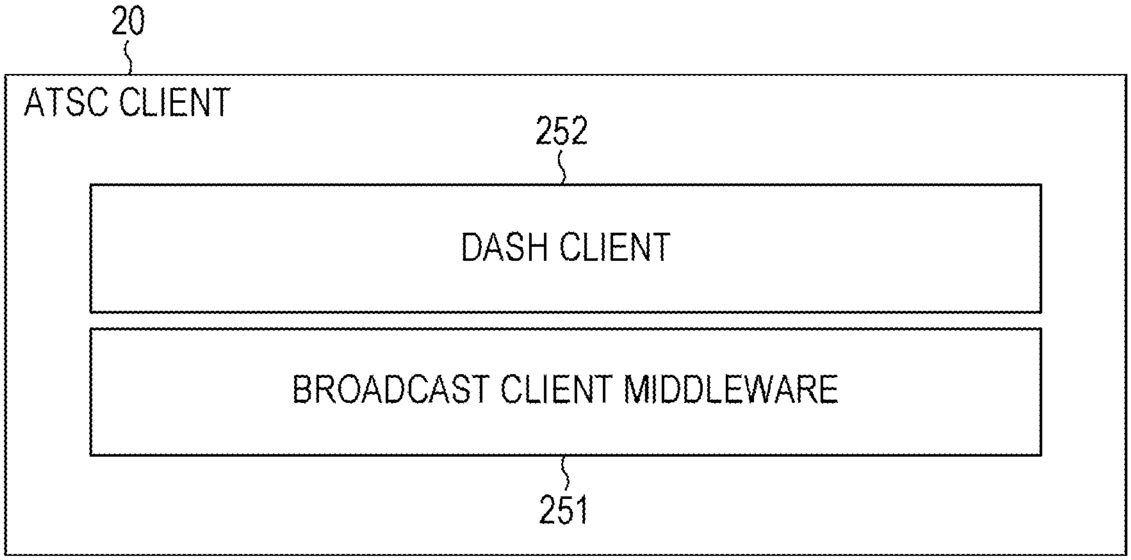
FIG. 22 is a diagram illustrating an exemplary configuration of software of the ATSC client.

FIG. 22 is a diagram illustrating an exemplary configuration of software of the ATSC client 20 of FIG. 21.

FIG. 22 illustrates the configuration of the ATSC client 20 illustrated in FIG. 21, as a software configuration. In FIG. 22, the ATSC client 20 includes a broadcast client middleware 251 and a DASH client 252.

The broadcast client middleware 251 acquires various data such as the segment data (including TTML file) or the signaling information (including MPD file) transmitted from the ATSC server 10, and performs processing for providing the various data to the DASH client 252.

The DASH client 252 processes various data such as the segment data (including TTML file) or the signaling information (including MPD file) transmitted from the broadcast client middleware 251, and performs processing for reproducing the content. For example, the DASH client 252 controls the display of the closed caption specified in the TTML file, at display time according to the TTML processing mode, based on the MPD file.

The ATSC client 20 is configured as described above.

<5. Processes Performed by Apparatuses>

Next, processes performed by the apparatuses constituting the transmission system 1 of FIG. 1 will be described, with reference to flowcharts of FIGS. 23 to 26.

(Transmission Process)

First, a transmission process performed by the ATSC server 10 of FIG. 1 will be described with reference to a flowchart of FIG. 23.

In step S101, a component signaling process is performed. In the component signaling process, various processing is performed for the video and audio (stream) data processed by the AV server 101, the closed caption data (TTML file) processed by the TTML server 102, the signaling information (MPD file) processed by the DASH server 103, or the signaling information (SLT metadata, USD metadata, LSID metadata, or the like) processed by the broadcast server 104, and the data of a component or the signaling information can be transmitted.

Figure 24:
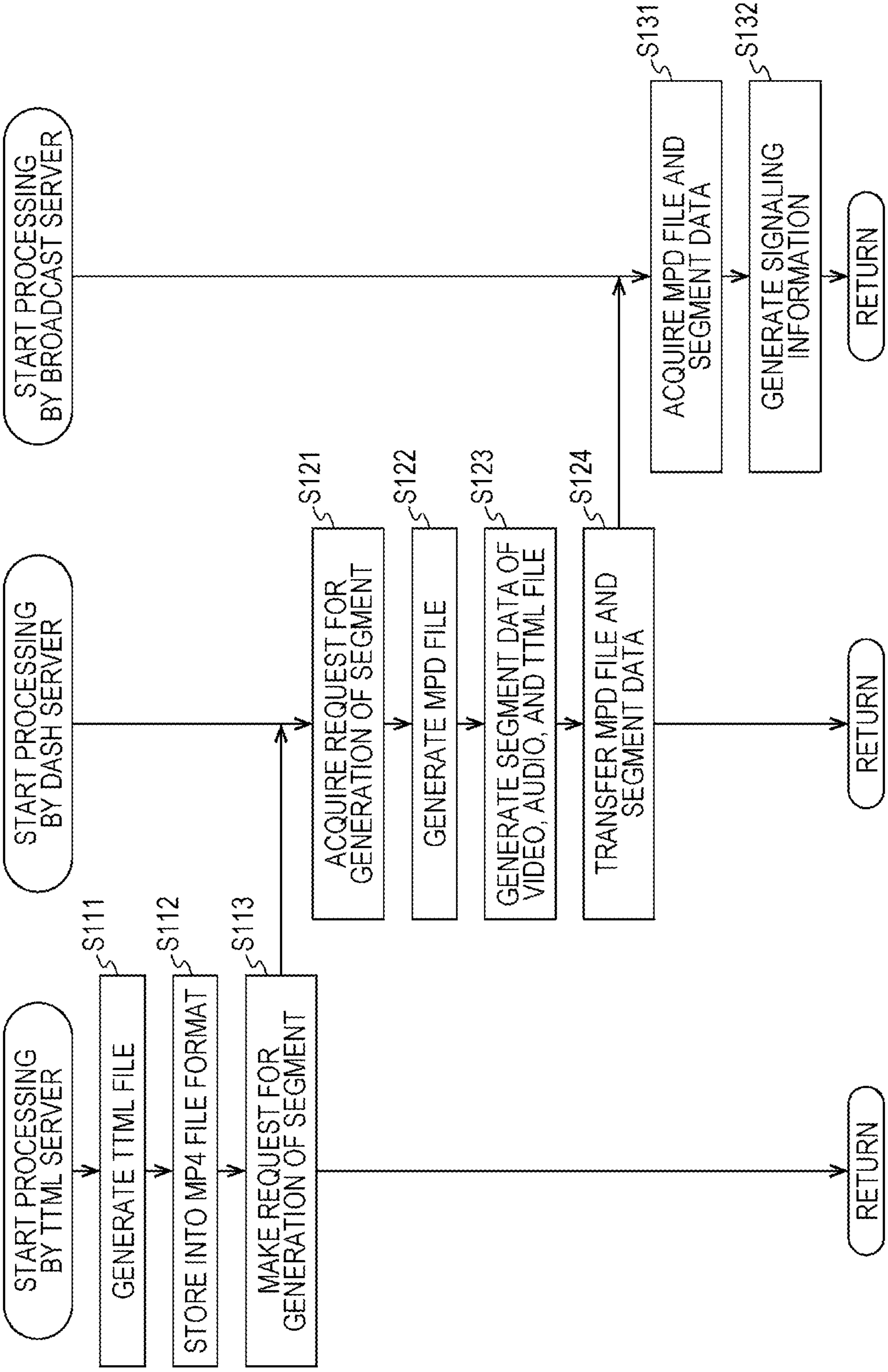
FIG. 24 is a flowchart illustrating component signaling process.

Note that detailed contents of the component signaling process of step S101 will be described later, with reference to a flowchart of FIG. 24.

In step S102, the transmission process is performed by the broadcast server 104 (transmission unit 121 or the like), and the data of a component, that is, the video, the audio, or the closed caption, and the signaling information processed in step S101 are transmitted as the digital broadcasting signal, through the antenna 105. The transmission process of FIG. 23 ends at step S102.

This is the end of the description of the transmission process performed by the ATSC server 10.

(Component Signaling Process)

The detailed contents of the component signaling process corresponding to the process of step S101 of FIG. 23 will be described here, with reference to the flowchart of FIG. 24. Note that, in FIG. 24, for simple description, processing performed by the AV server 101 is omitted, and description will be mainly made of processing performed by the TTML server 102, the DASH server 103, and the broadcast server 104.

In step S111, the TTML server 102 (closed caption generation unit 115) generates the TTML file.

In step S112, the TTML server 102 (closed caption encoder 116) stores the TTML file generated in the process of step S111, in the MP4 file format.

In step S113, the TTML server 102 makes a request to the DASH server 103 for generation of the segment (TTML segment) of the TTML file stored in the MP4 file format.

Note that although processing performed by the AV server 101 is omitted here, the video and audio data are stored in the MP4 file format and the request for generation of the segment is made to the DASH server 103 also in the AV server 101.

In step S121, the DASH server 103 acquires the request for generation of the segment from the TTML server 102 (and the AV server 101).

In step S122, the DASH server 103 (signaling generation unit 117) generates the MPD file. Herein, in the MPD file, as the selection information for selection of a TTML processing mode, a character string for identifying mode 1, mode 2-1, mode 2-2, or mode 3 is specified for the value of the schemeIdUri attribute of the EssentialProperty element or the SupplementalProperty element of the AdaptationSet element.

In step S123, the DASH server 103 (segment processing unit 119) uses the video and audio (stream) data from the AV server 101 and the TTML file from the TTML server 102 to generate the segment (segment data) in accordance with the MP4 file format.

In step S124, the DASH server 103 transfers the MPD file generated in the process of step S122 and the segment data generated in the process of step S123, to the broadcast server 104.

In step S131, the broadcast server 104 acquires the MPD file and the segment data from the DASH server 103.

In step S132, the broadcast server 104 (signaling generation unit 117) generates the signaling information such as the LLS information or the SLS information.

Figure 23:
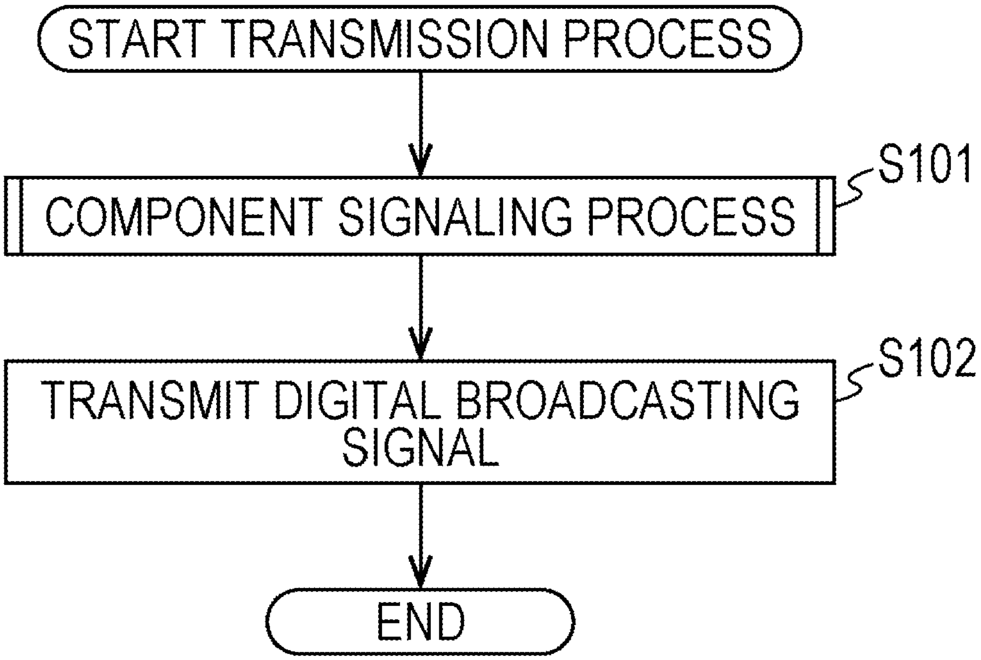
FIG. 23 is a flowchart illustrating transmission process.

After step S132, the process returns to step S101 of FIG. 23, and subsequent processing is performed. That is, in the broadcast server 104 (transmission unit 121 or the like), the above-mentioned process of step S102 (FIG. 23) is performed, and the segment data (including TTML file) or the signaling information (including MPD file) is transmitted as the digital broadcasting signal.

This is the end of the description of the component signaling process performed by the ATSC server 10. In the component signaling process, various processing is performed so that the ATSC client 20 uses the data of a component or the signaling information to reproduce the content. Furthermore, herein, when the closed caption is displayed superimposed on the video of the content, the MPD file including the selection information for selection of a TTML processing mode is generated and transmitted with the TTML file.

(Reception Process)

Figure 25:
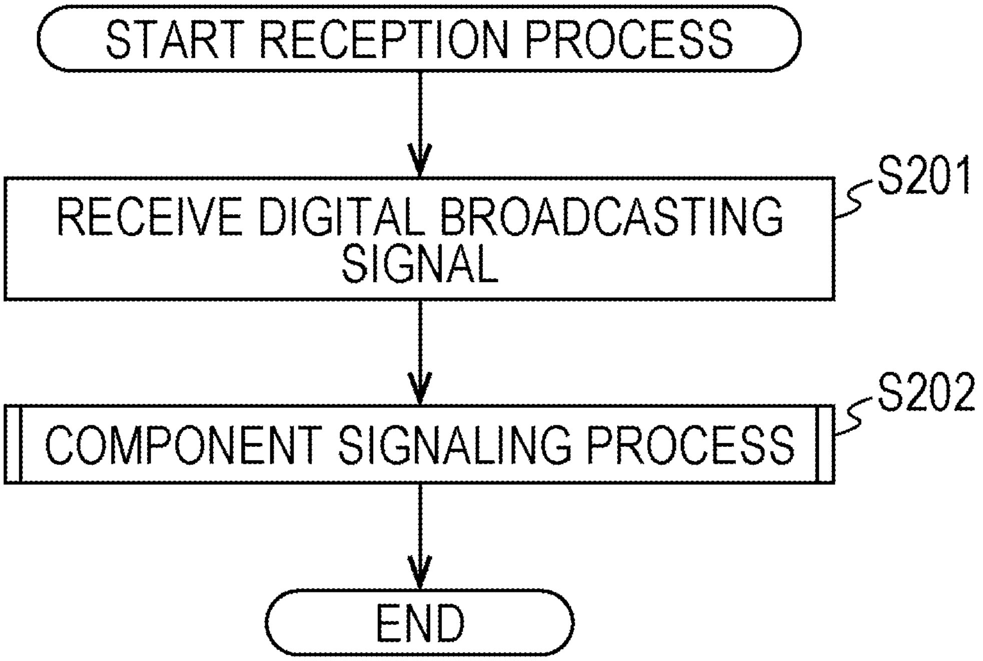
FIG. 25 is a flowchart illustrating reception process.

Next, a reception process performed by the ATSC client 20 of FIG. 1 will be described with reference to a flowchart of FIG. 25. Note that the reception process of FIG. 25 is performed, for example, when the user operates to select a desired service.

In step S201, the reception process is performed by the reception unit 212 or the like, and the digital broadcasting signal transmitted from the ATSC server 10 through the transmission path 30 is received through the antenna 211.

In step S202, a component signaling process is performed. In the component signaling process, the data of a component, that is, the video, the audio, or the closed caption, and the signaling information, obtained from the digital broadcasting signal received in the process of step S201 are processed, and the content according to user's selection operation is reproduced.

Figure 26:
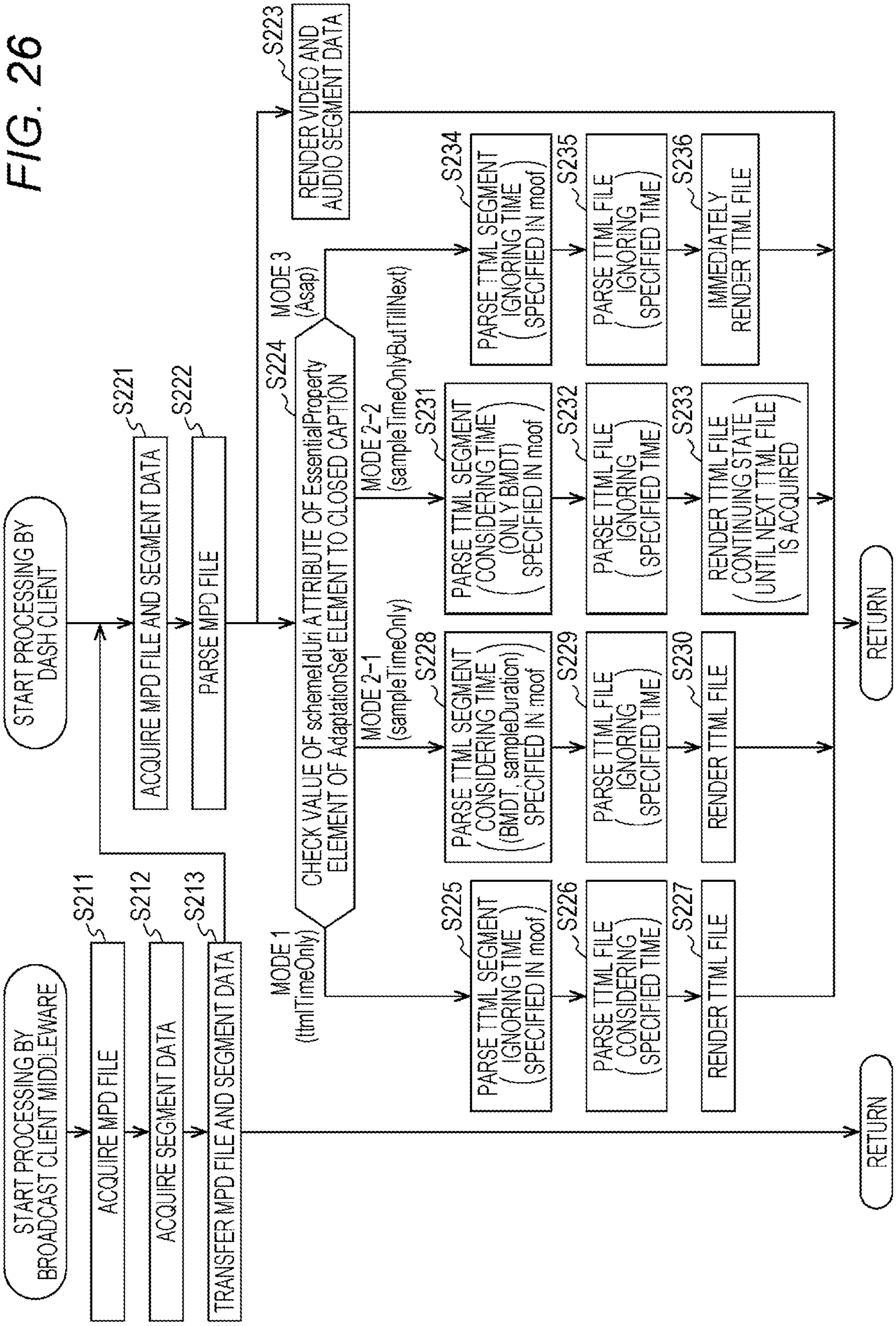
FIG. 26 is a flowchart illustrating component signaling process.

Note that detailed contents of the component signaling process of step S202 will be described later, with reference to the flowchart of FIG. 26. The reception process of FIG. 25 ends at step S202.

This is the end of the description of the reception process performed by the ATSC client 20.

(Component Signaling Process)

Herein, detailed contents of the component signaling process corresponding to the process of step S202 of FIG. 25 will be described with reference to the flowchart of FIG. 26. Note that FIG. 26 illustrates processing performed by the broadcast client middleware 251 and the DASH client 252 of FIG. 22.

In step S211, the broadcast client middleware 251 acquires the MPD file. Furthermore, in step S212, the broadcast client middleware 251 acquires the segment data.

In step S213, the broadcast client middleware 251 transfers the MPD file acquired in the process of step S211 and the segment data acquired in the process of step S212, to the DASH client 252.

In step S221, the DASH client 252 acquires the MPD file and the segment data transferred from the broadcast client middleware 251.

In step S222, the DASH client 252 parses the MPD file acquired in the process of step S221.

In step S223, the DASH client 252 performs rendering of the video and audio segment data acquired in the process of step S221, based on a result of the parsing of the MPD file in the process of step S222. Therefore, the video of the content is displayed on the display unit 222, and the sound is output from the speaker 223.

In step S224, the DASH client 252 checks the value (attribute value) of the schemeIdUri attribute of the EssentialProperty element of the AdaptationSet element corresponding to the closed caption, based on a result of the parsing of the MPD file in the process of step S222.

In step S224, when "ttmlTimeOnly" is determined to be specified as the value of the schemeIdUri attribute of the EssentialProperty element, mode 1 is set as the TTML processing mode. Thus, the process proceeds to step S225, and the processes of steps S225 to S227 are performed.

In step S225, the DASH client 252 parses the segment data (TTML segment) acquired in the process of step S221. However, in mode 1, the time information defined in the MP4 file format, that is, the time information such as BMDT or SampleDuration stored in the moof box is ignored.

In step S226, the DASH client 252 parses the TTML segment in the process of step S225 to parse the TTML file obtained from the TTML sample stored in the mdat box. In mode 1, in consideration of the time information specified in the TTML file, that is, the time information specified in the begin attribute or the end attribute of the p element in the body element, display of the closed caption is started at time specified in the begin attribute, and the display of the closed caption is finished at time specified in the end attribute.

In step S227, the DASH client 252 performs rendering based on a result of the parsing of the TTML file in the process of step S226, to display the closed caption as the character string specified in the p element in the body element, from the display start time specified in the begin attribute, to the display finish time specified in the end attribute.

As described above, when mode 1 is set as the TTML processing mode, the time information defined in the MP4 file format is ignored and the time information specified in the TTML file is considered, and thus, the closed caption can be displayed at desired time.

Further, in step S224, when "sampleTimeOnly" is determined to be specified as the value of the schemeIdUri attribute of the EssentialProperty element, mode 2-1 is set as the TTML processing mode. Thus, the process proceeds to step S228, and the processes of steps S228 to S230 are performed.

In step S228, the DASH client 252 parses the segment data (TTML segment) acquired in the process of step S221. In mode 2-1, in consideration of the time information defined in the MP4 file format, that is, the time information such as BMDT or SampleDuration stored in the moof box, display of the closed caption is started at the time according to BMDT, and the display is continued only during the time period according to SampleDuration stored in the moof box.

In step S229, the DASH client 252 parses the TTML segment in the process of step S228 to parse the TTML file obtained from the TTML sample stored in the mdat box. However, in mode 2-1, the time information specified in the TTML file, that is, the time information specified in the begin attribute or the end attribute of the p element is ignored.

In step S230, the DASH client 252 performs rendering based on a result of parsing in the processes of steps S228 and S229 to display the closed caption as the character string specified in the p element of the TTML file, from the time according to BMDT and during the time period according to SampleDuration.

Furthermore, in step S224, when "sampleTimeOnlyButTillNext" is determined to be specified as the value of the schemeIdUri attribute of the EssentialProperty element, mode 2-2 is set as the TTML processing mode. Thus, the process proceeds to step S231, and the processes of steps S231 to S233 are performed.

In step S231, the DASH client 252 parses the segment data (TTML segment) acquired in the process of step S221. In mode 2-2, in consideration of the time information defined in the MP4 file format, that is, the time information of BMDT stored in the moof box, display of the closed caption is started at the time according to BMDT corresponding to the target TTML sample, and the display is continued until the time according to BMDT corresponding to the next TTML sample.

In step S232, the DASH client 252 parses the TTML segment in the process of step S231 to parse the TTML file obtained from the TTML sample stored in the mdat box. However, in mode 2-2, the time information specified in the TTML file, that is, the time information specified in the begin attribute or the end attribute of the p element is ignored.

In step S233, the DASH client 252 performs rendering based on a result of parsing in the processes of steps S231 and S232 to display the closed caption as the character string specified in the p element of the TTML file obtained from the target TTML sample, from the time according to BMDT corresponding to the target TTML sample, to the time according to BMDT corresponding to the next TTML sample.

Note that, for recognition of the time according to BMDT corresponding to the next TTML sample, the process returns to step S231 to parse the TTML segment. That is, repeating the processes of steps S231 to S233 allows recognition of the time according to BMDT corresponding to the next TTML sample, and display of the closed caption specified in the TTML file obtained from the next TTML sample.

As described above, when mode 2 (mode 2-1, mode 2-2) is set as the TTML processing mode, the time information defined in the MP4 file format (time information for each TTML sample) is considered and the time information specified in the TTML file is ignored, and thus, the closed caption can be displayed at desired time.

Furthermore, in step S224, when "asap" is determined to be specified as the value of the schemeIdUri attribute of the EssentialProperty element, mode 3 is set as the TTML processing mode. Thus, the process proceeds to step S234, and the processes of steps S234 to S236 are performed.

In step S234, the DASH client 252 parses the segment data (TTML segment) acquired in the process of step S221. However, in mode 3, the time information defined in the MP4 file format, that is, the time information such as BMDT or SampleDuration stored in the moof box is ignored.

In step S235, the DASH client 252 parses the TTML segment in the process of step S234 to parse the TTML file obtained from the TTML sample stored in the mdat box. However, in mode 3, the time information specified in the TTML file, that is, the time information specified in the begin attribute or the end attribute of the p element is ignored.

In step S236, the DASH client 252 immediately performs rendering of the TTML file, based on a result of parsing of the TTML file in the process of step S235 to display the closed caption as the character string specified in the p element of the TTML file. Note that, display of the closed caption thus displayed is finished, when the next TTML file (TTML sample) is acquired.

As described above, when mode 3 is set as the TTML processing mode, the closed caption is immediately displayed, ignoring the time information defined in the MP4 file format (time information for each TTML sample) and the time information specified in the TTML file, and thus, the closed caption can be displayed at desired time.

This is the end of the description of the component signaling process performed by the ATSC client 20. In the component signaling process, the data of a component or the signaling information transmitted from the ATSC server 10 is used to reproduce the content. Furthermore, when the closed caption is displayed superimposed on the video of the content, the MPD file including the selection information for selection of a TTML processing mode is acquired, and thus, the closed caption specified in the TTML file is displayed at display time according to the TTML processing mode.

<6. Modifications>

In the above description, the ATSC (e.g., ATSC 3.0) is a system adopted in the United States or the like, as the digital broadcasting standard, but the present technology may be applied to an integrated services digital broadcasting (ISDB) being a system adopted in Japan or the like or a digital video broadcasting (DVB) being a system adopted in European countries or the like.

Furthermore, the name of the signaling information, such as the SLT is only an example, and another name may be used. Even if another name is used as the name of the signaling information, this means the signaling information is merely formally changed in name, and does not influence the practical content of the signaling information. For example, the SLT is often referred to as a fast information table (FIT).

Furthermore, in the above description, the TTML file or the MPD file is transmitted as the digital broadcasting signal by the ATSC server 10, but the files may be distributed from a server on the Internet. For example, the closed caption in the TTML file may be distributed through communication to be displayed superimposed on video of a content distributed through broadcasting. Furthermore, the video or audio (stream) data may be adaptively streamed from a server on the Internet. However, the streaming conforms to the MPEG-DASH standard.

Furthermore, in the above description, the attribute value of the schemeIdUri attribute of the EssentialProperty element or the SupplementalProperty element of the AdaptationSet element is used in the MPD file, for specification of the TTML processing mode, but the TTML processing mode may be specified using another element or attribute. Furthermore, in the Representation element or the SubRepresentation element, the TTML processing mode may be specified using the attribute value of the schemeIdUri attribute of the EssentialProperty element or the SupplementalProperty element. Furthermore, as long as the TTML processing mode is recognized upon processing of the TTML file, the TTML processing mode may be specified using signaling information or the like other than the MPD file.

<7. Configuration of Computer>

Figure 27:
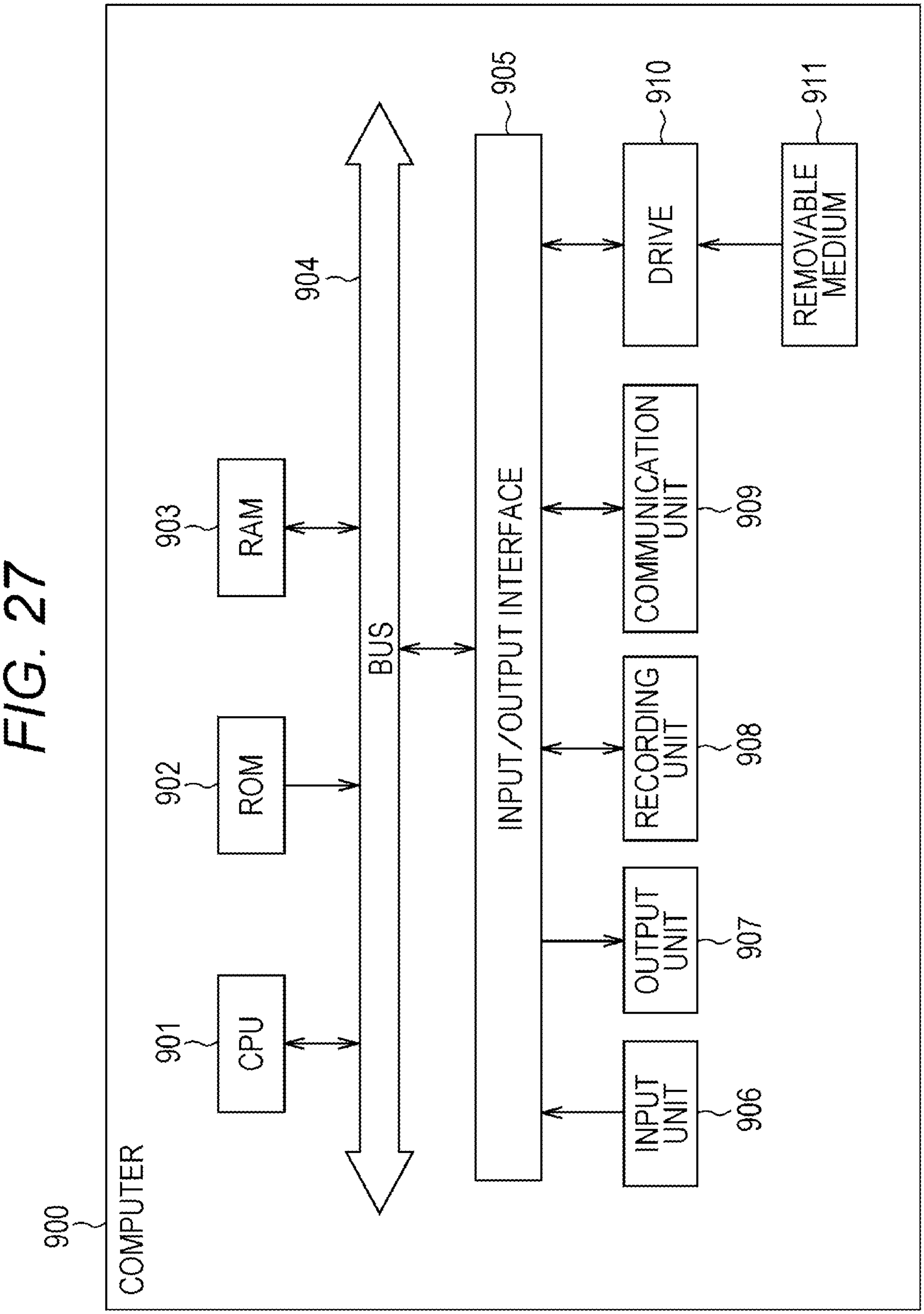
FIG. 27 is a diagram illustrating an exemplary configuration of a computer.

The above-mentioned series of processes may be performed by hardware or software. When the above-mentioned series of processes is performed by the software, programs constituting the software are installed in a computer. FIG. 27 is a block diagram illustrating an exemplary configuration of the hardware of the computer performing the above-mentioned series of processes by the programs.

In the computer 900, a central processing unit (CPU) 901, read only memory (ROM) 902, and random access memory (RAM) 903 are connected to each other through a bus 904. Further, the bus 904 is connected to an input/output interface 905. The input/output interface 905 is connected to an input unit 906, an output unit 907, a recording unit 908, a communication unit 909, and a drive 910.

The input unit 906 includes a keyboard, a mouse, a microphone, or the like. The output unit 907 includes a display, a speaker, or the like. The recording unit 908 includes a hard disk, non-volatile memory, or the like. The communication unit 909 includes a network interface or the like. The drive 910 drives a removable medium 911 such as a magnetic disk, an optical disk, a magnetooptical disk, or a semiconductor memory.

In the computer 900 configured as described above, the CPU 901 loads the programs recorded in the ROM 902 or the recording unit 908 into the RAM 903 through the input/output interface 905 and the bus 904, and executes the programs. Thereby, the above-mentioned series of processes is performed.

The programs executed by the computer 900 (CPU 901) can be provided by being recorded in, for example, the removable medium 911 as a package medium or the like. Additionally, the programs can be provided through a wired or wireless transmission medium such as a local area network, the Internet, or digital satellite broadcasting.

In the computer 900, the programs can be installed in the recording unit 908 through the input/output interface 905, by mounting the removable medium 911 to the drive 910. Additionally, the programs can be received at the communication unit 909 through the wired or wireless transmission medium, and installed in the recording unit 908. The program can be previously installed in the ROM 902 or the recording unit 908.

In the present specification, the process performed by the computer according to the program is not necessarily performed chronologically along the flowchart sequence described above. That is, the process performed by the computer according to the program also includes processes performed separately or in parallel (e.g., parallel process or object-based process). Furthermore, the program may be executed by one computer (processor), or may be distributedly executed by a plurality of computers.

The present technology is not intended to be limited to the above-mentioned embodiments, and various modifications and variations may be made without departing from the scope and spirit of the present technology.

Furthermore, the present technology may also include the following configuration.

(1)

A reception apparatus including:

circuitry configured to receive a digital data stream;

acquire closed caption information included in the digital data stream, acquire control information including selection information indicating a selection of a specific mode from a plurality of modes for specifying when closed caption text is to be displayed; and output the closed caption text included in the closed caption information for display to a user, at a display time according to the specific mode, based on the selection information included in the control information.

(2)

The reception apparatus according to (1), in which the closed caption information is a timed text markup language (TTML) file, the closed caption information includes data in accordance with an MPEG-4 (MP4) file format, the control information is a media presentation description (MPD) file in an extensible markup language (XML) format, and the TTML file and the MPD file are transmitted in a real-time object delivery over unidirectional transport (ROUTE) session.

(3)

The reception apparatus according to (2), in which the plurality of modes includes a first mode for display of the closed caption text according to time information specified in the TTML file, and when the specific mode is the first mode, the circuitry is configured to output the closed caption text specified in the TTML file for display according to the time information specified in the TTML file.

(4)

The reception apparatus according to (2) or (3), in which the plurality of modes includes a second mode for display of the closed caption text according to time information defined in the MP4 file format, and when the specific mode is the second mode, the circuitry is configured to output the closed caption text specified in the TTML file for display according to the time information defined in the MP4 file format.

(5)

The reception apparatus according to (4), in which the circuitry is configured to start the output of the closed caption text for display according to a media decode time defined in the MP4 file format and stored in a predetermined box, and only continue the output the closed caption text during a time period according to a sample duration stored in the predetermined box.

(6)

The reception apparatus according to (4), in which the circuitry is configured to start the output of the closed caption text for display according to a first media decode time defined in the MP4 file format and stored in a first predetermined box corresponding to a second predetermined box that stores target closed caption data, and continue the output until a time according to a second media decode time stored in a third predetermined box corresponding to a fourth predetermined box that stores next closed caption data.

(7)

The reception apparatus according to any of (2) to (4), in which the plurality of modes includes a third mode for display of the closed caption text irrespective of time information defined in the MP4 file format, and when the specific mode is the third mode, the circuitry is configured to output the closed caption text specified in the TTML file for display immediately upon acquiring the TTML file.

(8)

The reception apparatus according to any of (2) to (7), in which the selection information is specified as extensive information about the MPD file.

(9)

The reception apparatus according to any one of (2) to (8), in which the selection information is specified based on a scheme attribute of a property element, in adaptation set elements arranged in a period element of an MPD element.

(10)

A data processing method including:

acquiring, by circuitry of a reception apparatus, closed caption information included in a digital data stream;

acquiring, by the circuitry of the reception apparatus, control information including selection information indicating a selection of a specific mode from a plurality of modes for specifying when closed caption text is to be displayed; and controlling, by the circuitry of the reception apparatus, output of the closed caption text included in the closed caption information, at a display time according to the specific mode, based on the selection information included in the control information.

(11)

A transmission apparatus including:

circuitry configured to generate control information including selection information indicating a selection of a specific mode from a plurality of modes for specifying when closed caption text is to be displayed; and transmit a digital data stream including the control information and closed caption information including the closed caption text.

(12)

The transmission apparatus according to (11), in which the closed caption information is a timed text markup language (TTML) file, the closed caption information includes data in accordance with an MPEG-4 (MP4) file format, the control information is a media presentation description (MPD) file in an extensible markup language (XML) format, and the TTML file and the MPD file are transmitted in a real-time object delivery over unidirectional transport (ROUTE) session.

(13)

The transmission apparatus according to (12), in which the plurality of modes includes a first mode for display of the closed caption text according to time information specified in the TTML file.

(14)

The transmission apparatus according to (12) or (13), in which the plurality of modes includes a second mode for display of the closed caption text according to time information defined in the MP4 file format.

(15)

The transmission apparatus according to (14), in which the second mode causes display of the closed caption text to start according to a media decode time defined in the MP4 file format and stored in a predetermined box, and the display of the closed caption text only continues during a time period according to a sample duration stored in the predetermined box.

(16)

The transmission apparatus according to (14), in which the second mode causes display of the closed caption text to start according to a first media decode time defined in the MP4 file format and stored in a first predetermined box corresponding to a second predetermined box that stores target closed caption data, and the display of the closed caption text to continue until a time according to a second media decode time stored in a third predetermined box corresponding to a fourth predetermined box that stores next closed caption data.

(17)

The transmission apparatus according to any of (12) to (14), in which the plurality of modes includes a third mode for display of the closed caption text irrespective of time information defined in the MP4 file format.

(18)

The transmission apparatus according to any of (12) to (17), in which the selection information is specified as extensive information about the MPD file.

(19)

The transmission apparatus according to any of (12) to (18), in which the selection information is specified based on a scheme attribute of a property element, in adaptation elements arranged in a period element of an MPD element.

(20)

A data processing method including:

generating, by circuitry of a transmission apparatus, control information including selection information indicating a selection of a specific mode from a plurality of modes for specifying when closed caption text is to be displayed; and transmitting, by the circuitry of the transmission apparatus, a digital data stream including the control information and closed caption information including the closed caption text.

(21)

A reception apparatus including:

a reception unit configured to receive digital broadcast waves;

an acquisition unit configured to acquire closed caption information about closed caption transmitted over the broadcast waves, and control information including selection information for selection of a specific mode from a plurality of modes for specifying display timing of the closed caption; and a control unit configured to control the display of the closed caption according to the closed caption information, at display time according to the specific mode, based on the selection information included in the control information.

(22)

The reception apparatus according to (21), in which the closed caption information is a timed text markup language (TTML) file in TTML format, the closed caption information having data in accordance with the MP4 file format, the control information is a media presentation description (MPD) file in extensible markup language (XML) format, and the TTML file and the MPD file are transmitted in a real-time object delivery over unidirectional transport (ROUTE) session.

(23)

The reception apparatus according to (22), in which the plurality of modes includes a first mode for display of the closed caption at time according to time information specified in the TTML file, and when the specific mode has the first mode, the control unit display the closed caption specified in the TTML file at time according to time information specified in the TTML file.

(24)

The reception apparatus according to (22) or (23), in which the plurality of modes includes a second mode for display of the closed caption at time according to time information defined in the MP4 file format, and when the specific mode has the second mode, the control unit display the closed caption specified in the TTML file at time according to time information defined in the MP4 file format.

(25)

The reception apparatus according to (24), in which at time according to BaseMediaDecodeTime (BMDT) defined in the MP4 file format and stored in a moof box, the control unit starts to display the closed caption, and continues the display only during a time period according to SampleDuration stored in the moof box.

(26)

The reception apparatus according to (24), in which at the time according to BMDT defined in the MP4 file format and stored in a moof box corresponding to an mdat box storing data about a target closed caption, the control unit starts to display the closed caption, and continues the display until the time according to BMDT stored in a moof box corresponding to an mdat box storing data about a next closed caption.

(27)

The reception apparatus according to any of (22) to (24), in which the plurality of modes includes time information specified in the TTML file, and a third mode for display of the closed caption ignoring time information defined in the MP4 file format, and when the specific mode has the third mode, the control unit displays the closed caption specified in the TTML file immediately upon acquiring the TTML file.

(28)

The reception apparatus according to any of (22) to (27), in which the selection information is specified as extensive information about the MPD file.

(29)

The reception apparatus according to (28), in which the selection information is specified based on a schemeIdUri attribute of an EssentialProperty element or a SupplementalProperty element, in AdaptationSet elements arranged in a Period element of an MPD element.

(30)

A data processing method including:

acquiring closed caption information about closed caption transmitted over digital broadcast waves, and control information including selection information for selection of a specific mode from a plurality of modes for specifying display timing of the closed caption; and controlling the display of the closed caption according to the closed caption information, at display time according to the specific mode, based on the selection information included in the control information.

(31)

A transmission apparatus including:

a generation unit configured to generate control information including selection information for selection of a specific mode from a plurality of modes for specifying display timing of a closed caption; and a transmission unit configured to transmit the control information over digital broadcast wave, together with closed caption information about the closed caption.

(32)

The transmission apparatus according to (31), in which the closed caption information is a TTML file in TTML format, the closed caption information has data in accordance with the MP4 file format, the control information has an MPD file in XML format, and the TTML file and the MPD file are transmitted in a ROUTE session.

(33)

The transmission apparatus according to (32), in which the plurality of modes includes a first mode for display of the closed caption at time according to time information specified in the TTML file.

(34)

The transmission apparatus according to (32) or (33), in which the plurality of modes includes a second mode for display of the closed caption at time according to time information defined in the MP4 file format.

(35)

The transmission apparatus according to (34), in which the second mode is a mode for starting display of the closed caption at time according to BMDT defined in the MP4 file format and stored in a moof box, and continuing the display only during a time period according to SampleDuration stored in the moof box.

(36)

The transmission apparatus according to (34), in which the second mode is a mode for starting display of the closed caption at time according to BMDT defined in the MP4 file format and stored in a moof box corresponding to an mdat box storing data about a target closed caption, and continuing the display until time according to BMDT stored in a moof box corresponding to an mdat box storing data about a next closed caption.

(37)

The transmission apparatus according to any of (32) to (34), in which the plurality of modes includes time information specified in the TTML file, and a third mode for display of the closed caption ignoring time information defined in the MP4 file format.

(38)

The transmission apparatus according to any of (32) to (37), in which the selection information is specified as extensive information about the MPD file.

(39)

The transmission apparatus according to (38), in which the selection information is specified based on a schemeIdUri attribute of an EssentialProperty element or a SupplementalProperty element, in AdaptationSet elements arranged in a Period element of an MPD element.

(40)

A data processing method including:

generating control information including selection information for selection of a specific mode from a plurality of modes for specifying display timing of the closed caption, the control information being transmitted over digital broadcast wave, together with closed caption information about closed caption.

REFERENCE SIGNS LIST

1 Transmission system
10 ATSC server
20 ATSC client
30 Transmission path
101 AV server
102 TTML server
103 DASH server
104 Broadcast server
111 Video data acquisition unit
112 Video encoder
113 Audio data acquisition unit
114 Audio encoder
115 Closed caption generation unit
116 Closed caption encoder
117 Signaling generation unit
118 Signaling processing unit
119 Segment processing unit
120 Multiplexer
121 Transmission unit
212 Reception unit
213 Demultiplexer
214 Control unit 217 Video decoder
218 Video output unit
219 Audio decoder
220 Audio output unit
221 Closed caption decoder
241 MP4 parser
242 TTML parser
251 Broadcast client middleware
252 DASH client
900 Computer
901 CPU

The invention claimed is:

1. A reception apparatus comprising:
circuitry configured to:
receive a digital data stream;
acquire, from the digital data stream, a text markup language (TTML) file that includes closed caption information;
acquire a media presentation description (MPD) file that includes control information including selection information indicating a selection of a specific TTML timing mode from a plurality of TTML timing modes, each of the plurality of TTML timing modes from which the specific TTML timing mode in the MPD is selected defines whether to ignore or comply with time information provided in the TTML file and whether to ignore or comply with time information provided in a video file included in the digital data stream;
determine a display time of closed caption text included in the closed caption information based on the specific TTML timing mode indicated by the MPD file; and
output the closed caption text for display, at the determined display time.

2. The reception apparatus according to claim 1, wherein the closed caption information includes data in accordance with a video file format,
the MPD file is in an extensible markup language (XML) format, and
the TTML file and the MPD file are transmitted in a real-time object delivery over unidirectional transport (ROUTE) session.

3. The reception apparatus according to claim 2, wherein the plurality of TTML timing modes includes a first timing mode for the display of the closed caption text according to the time information specified in the TTML file, and
when the specific TTML timing mode is the first timing mode, the circuitry is configured to output the closed caption text specified in the TTML file for display according to the time information specified in the TTML file.

4. The reception apparatus according to claim 2, wherein the plurality of TTML timing modes includes a second timing mode for the display of the closed caption text according to the time information defined in the video file, and
when the specific TTML timing mode is the second timing mode, the circuitry is configured to output the closed caption text specified in the TTML file for display according to the time information defined in the video file.

5. The reception apparatus according to claim 4, wherein the circuitry is configured to:
start the output of the closed caption text for display according to a media decode time defined in the video file and stored in a predetermined box, and
only continue the output of the closed caption text during a time period according to a sample duration stored in the predetermined box.

6. The reception apparatus according to claim 4, wherein the circuitry is configured to:
start the output of the closed caption text for display according to a first media decode time defined in the video file and stored in a first predetermined box corresponding to a second predetermined box that stores target closed caption data, and
continue the output until a time according to a second media decode time stored in a third predetermined box corresponding to a fourth predetermined box that stores next closed caption data.

7. The reception apparatus according to claim 2, wherein the plurality of TTML timing modes includes a third timing mode for the display of the closed caption text irrespective of the time information defined in the video file, and
when the specific TTML timing mode is the third timing mode, the circuitry is configured to output the closed caption text specified in the TTML file for display immediately upon acquiring the TTML file.

8. The reception apparatus according to claim 2, wherein the selection information is specified based on a scheme attribute of a property element, in adaptation set elements arranged in a period element of an MPD element.

9. The reception apparatus according to claim 1, wherein the plurality of TTML, timing modes correspond to different methods for determining the display time.

10. A data processing method comprising:
receiving, by circuitry of a reception apparatus, a digital data stream;
acquiring, by the circuitry of the reception apparatus, a text markup language (TTML) file that includes closed caption information;
acquiring, by the circuitry of the reception apparatus, a media presentation description (MPD) file that includes control information including selection information indicating a selection of a specific TTML timing mode from a plurality of TTML timing modes, each of the plurality of TTML timing modes from which the specific TTML timing mode in the MPD is selected defines whether to ignore or comply with time information provided in the TTML file and whether to ignore or comply with time information provided in a video file included in the digital data stream;
determining a display time of closed caption text included in the closed caption information based on the specific TTML timing mode indicated by the MPD file; and
controlling, by the circuitry of the reception apparatus, output of the closed caption text, at the determined display time.

11. The data processing method according to claim 10, wherein
the closed caption information includes data in accordance with a video file format,
the MPD file is in an extensible markup language (XML) format, and
the TTML file and the MPD file are transmitted in a real-time object delivery over unidirectional transport (ROUTE) session.

12. A transmission apparatus comprising:

circuitry configured to:

generate a media presentation description (MPD) file that includes control information including selection information indicating a selection of a specific text markup language (TTML) timing mode from a plurality of TTML timing modes, each of the plurality of TTML timing modes from which the specific TTML timing mode in the MPD is selected defines whether to ignore or comply with time information provided in a TTML file and whether to ignore or comply with time information provided in a video file included in a digital data stream; and transmit the digital data stream including the MPD file that includes the control information and the TTML file that includes closed caption information including closed caption text which is displayed at a display time that is determined according to the specific TTML timing mode indicated by the MPD file.

13. The transmission apparatus according to claim 12, wherein the closed caption information includes data in accordance with a video file format, the MPD file is in an extensible markup language (XML) format, and the TTML file and the MPD file are transmitted in a real-time object delivery over unidirectional transport (ROUTE) session.

14. The transmission apparatus according to claim 13, wherein the plurality of TTML timing modes includes a first timing mode for display of the closed caption text according to the time information specified in the TTML file.

15. The transmission apparatus according to claim 13, wherein the plurality of TTML timing modes includes a second timing mode for display of the closed caption text according to the time information defined in the video file.

16. The transmission apparatus according to claim 15, wherein the second timing mode causes:

the display of the closed caption text to start according to a media decode time defined in the video file and stored in a predetermined box, and the display of the closed caption text only continues during a time period according to a sample duration stored in the predetermined box.

17. The transmission apparatus according to claim 15, wherein the second timing mode causes:

the display of the closed caption text to start according to a first media decode time defined in the video file and stored in a first predetermined box corresponding to a second predetermined box that stores target closed caption data, and the display of the closed caption text to continue until a time according to a second media decode time stored in a third predetermined box corresponding to a fourth predetermined box that stores next closed caption data.

18. The transmission apparatus according to claim 13, wherein the plurality of TTML timing modes includes a third timing mode for display of the closed caption text irrespective of time information defined in the video file.

19. The transmission apparatus according to claim 13, wherein the selection information is specified based on a scheme attribute of a property element, in adaptation elements arranged in a period element of an MPD element.

20. A data processing method comprising generating, by circuitry of a transmission apparatus, a media presentation description (MPD) file that includes control information including selection information indicating a selection of a specific text markup language (TTML) timing mode from a plurality of TTML timing modes, each of the plurality of TTML timing modes from which the specific TTML timing mode in the MPD is selected defines whether to ignore or comply with time information provided in a TTML file and whether to ignore or comply with time information provided in a video file included in a digital data stream; and transmitting, by the circuitry of the transmission apparatus, the digital data stream including the MPD file that includes the control information and the TTML file that includes closed caption information including closed caption text which is displayed at a display time that is determined according to the specific TTML timing mode indicated by the MPD file.

* * * * *

UNITED STATES PATENT AND TRADEMARK OFFICE

CERTIFICATE OF CORRECTION

PATENT NO. : 11,622,088 B2
APPLICATION NO. : 15/564056
DATED : April 4, 2023
INVENTOR(S) : Naohisa Kitazato et al.

It is certified that error appears in the above-identified patent and that said Letters Patent is hereby corrected as shown below:

On the Title Page

Item (71) should read:
-- (71) Applicant: Saturn Licensing LLC, New York, NY (US) --

Signed and Sealed this
Nineteenth Day of September, 2023

Katherine Kelly Vidal

Katherine Kelly Vidal
*Director of the United States Patent and Trademark Office*